United States Patent [19]

Fields et al.

[11] Patent Number: 5,157,602

[45] Date of Patent: Oct. 20, 1992

[54] APPARATUS AND METHOD FOR GENERATING NUMBER SETS

[76] Inventors: Scott J. Fields, 1104 Lincoln Dr. West; Stephen B. Richter, 1620 Norristown Rd., both of Ambler, Pa. 19002

[21] Appl. No.: 475,775

[22] Filed: Feb. 6, 1990

[51] Int. Cl.⁵ .................. G06F 15/28; A63B 71/00
[52] U.S. Cl. .................. 364/412; 273/144 B; 273/148 R; 364/410
[58] Field of Search ............ 364/412, 410, 567; 273/148 R, 237, 144 B

[56] References Cited

U.S. PATENT DOCUMENTS

| 4,583,736 | 4/1986 | Lorraine | 273/144 B |
|---|---|---|---|
| 4,610,323 | 9/1986 | Chenoweth et al. | 364/567 |
| 4,665,502 | 5/1987 | Kreisner | 364/900 |
| 4,692,863 | 9/1987 | Moosz | 364/412 |
| 4,713,787 | 12/1987 | Rapp | 364/717 |
| 4,781,379 | 11/1988 | Parks | 273/148 R |
| 4,796,890 | 1/1989 | Snyder | 273/144 B |
| 4,801,145 | 1/1989 | Arevalo | 273/143 R |
| 4,813,676 | 3/1989 | Weatherspoon | 273/144 A |
| 4,922,522 | 5/1990 | Scanlon | 364/412 |
| 4,939,853 | 6/1990 | Brule et al. | 364/412 |
| 4,959,783 | 9/1990 | Scott et al. | 364/412 |

OTHER PUBLICATIONS

"Dr. Z's 6/49 Lotto Guidebook", Dr. William T. Ziemba, 1986 front and back cover, pp. 43–60, 96, 97.
"Completely Lottery Resource Guide—Lotto Planner-+—The Games Across America", Robert Serotic, 1987.
"Lotto—How To Wheel A Fortune", Gail Howard, 1988.

Primary Examiner—Dale M. Shaw
Assistant Examiner—Xuong Chung
Attorney, Agent, or Firm—Synnestvedt & Lechner

[57] ABSTRACT

A device for generating winning lotto and keno combinations. The invention comprises means for inputting a number comporting to the total size of a lottery number pool; keypad means for inputting a minimum winning prize level; means in accordance with a prestored algorithm for generating a plurality of number combinations utilizing each number in said number pool, said number combinations guaranteeing a winning combination at said a minimum prize level; and means for outputting said number combinations.

13 Claims, 31 Drawing Sheets

FIG. 7

30 Number set

FROM FIG. 15b

PICKSEED 10(1) = K1
PICKSEED 10(2) = K2
PICKSEED 10(2) = K3
PICKSEED 10(4) = K4
PICKSEED 10(5) = K5
PICKSEED 10(6) = K6
PICKSEED 10(7) = K7
PICKSEED 10(8) = K8
PICKSEED 10(9) = K9
PICKSEED 10(10) = K10

FIG. 15b CONTINUED

FROM FIG. 15b

FROM FIG. 15b

DO 20 Y=1,0
MATCH 1=0
DO 30 N=1,10
DO 40 N=1,10

COMPARE PICKS
WITH PICKSEEDS
FOR EACH
MATCHING NUMBER
INCREMENT MATCH 40
30
20
CONTINUE

YES — IF NUMBER OF MATCHES > MIV — NO

STORE NEW COMBINATION

ACCEPT AS SELECTED COMBINATION AND ADD TO PICKS

FROM FIG. 16c

```
PICKSEED 7(1) = K1
PICKSEED 7(2) = K2
PICKSEED 7(3) = K3
PICKSEED 7(4) = K4
PICKSEED 7(5) = K5
PICKSEED 7(6) = K6
PICKSEED 7(7) = K7
```

```
DO 20 Y=1,0
MATCH 1=0
DO 30 N=1,7
DO 40 M=1,7
```

COMPARE PICKS WITH PICKSEEDS FOR EACH MATCHING NUMBER INCREMENT MATCH

```
40
30
20 CONTINUE
```

FROM FIG. 16c · FROM FIG. 16c

IF NUMBER OF MATCHES > MIV

YES — NO

STORE NEW COMBINATION

ACCEPT AS SELECTED COMBINATION AND ADD TO PICKS

1,2,3,4,5,6
1,2,3,4,5,7,
" "
" "
" "
1,2,3,4,5,40
1,2,3,4,6,7
" "
" "
1,2,3,4,6,40
1,2,3,4,7,8
" "
" "
" "
1,2,3,4,39,40
1,2,3,5,6,7
" "
" "
" "
1,36,37,38,39,40
4,5,6,7,8,9   (4 out of 6)
   or
2,3,4,5,6,7   (3 out of 6)

|  |  | \multicolumn{6}{c}{MIV = 3} |
|---|---|---|---|---|---|---|---|
|  |  | 1 | 2 | 3 | 38 | 39 | 40 |
| MATCH = 1 | 1 | X | 0 | 0 | 0 | 0 | 0 |
| MATCH = 2 | 2 | 0 | X | 0 | 0 | 0 | 0 |
|  | 24 | 0 | 0 | 0 | 0 | 0 | 0 |
|  | 33 | 0 | 0 | 0 | 0 | 0 | 0 |
|  | 37 | 0 | 0 | 0 | 0 | 0 | 0 |
| MATCH = 3 | 39 | 0 | 0 | 0 | 0 | X | 0 |

MATCH = MIV, THEREFORE REJECT
1,2,24,33,37,39

APPARATUS AND METHOD FOR GENERATING NUMBER SETS

FIELD OF THE INVENTION

The present invention is directed to apparatus and methods for generating number sets. Specifically, the present invention is directed to apparatus and methods for generating winning number sets for games such as lotto and keno.

BACKGROUND OF THE INVENTION

The present invention is directed to devices for generating number sets. Specifically, the present invention is directed to devices for generating winning number sets for games such as lotto and keno. Lotto has gained great popularity both in the U.S. and abroad. Today, legal lotto games are conducted in over 35 states and Canadian provinces as well as internationally in over 25 countries.

Lotto is a gambling game in which the wagerer must correctly pick a pre-set quantity of numbers to be drawn from a larger pool of numbers. Keno is a variation of lotto. In keno, a larger quantity of numbers is selected by the player. Winning tickets are paid in instances where either a small or large percentage of the numbers selected by the player are drawn. For example, New York state conducts a keno game in which the player selects 10 numbers from a number pool containing 80 numbers. Twenty numbers are then drawn from the pool. The player wins varying cash prizes if he has correctly selected either between 0-3 of the drawn numbers or between 7-10 of the drawn numbers. No payment is awarded is awarded if the player has selected 4, 5, or 6 of the 20 drawn numbers.

In most modern lotto and keno games, the player fills out computer coded cards with selected number combinations. The cards are then presented to an authorized lottery dealer. Lotto tickets containing the one or more selected number sets are then generated by a computerized ticket generator and purchased by the player. Lotto ticket generators typically contain random number generators, such as that disclosed in U.S. Pat. No. 4,665,502, for randomly selecting number sets for players who do not choose to pick their own number combinations.

At the time of the drawing (which is televised in many jurisdictions), the numbers (usually printed on balls) are withdrawn from a pool using number selection devices such as those disclosed in U.S. Pat. Nos. 4,583,736, 4,796,890 and 4,813,676. The balls are drawn without replacement (i.e., after a particular number is drawn, it is not returned to the pool and cannot be redrawn). If a preset number of the withdrawn balls correspond to the numbers preselected by the player on a particular ticket, the player wins a cash prize.

Currently existing lotto and keno games pay cash awards in instances where a player picks all of the drawn numbers (corresponding to a jackpot) as well as in instances where the player picks a percentage of the selected numbers (e.g. 3, 4 or 5 out of 6). In addition, different lotto games have varying pool sizes and draw different quantities of numbered balls. For example, Florida conducts a lotto game in which six numbered balls are drawn from a forty-nine number pool, and in which a player will win a cash prize of varying value if he has correctly picked 3, 4, 5, or all 6 of the ultimately drawn numbers. Delaware sponsors a lottery in which six numbered balls are drawn from a thirty-six number pool and in which cash payouts are awarded for each card containing 4, 5, or 6 of the drawn numbers. Pennsylvania currently conducts a lottery in which eleven (11) numbers are drawn from an eighty (80) number pool for which cash prizes are paid out if the player has correctly selected between four and seven numbers of the eleven numbers drawn.

The fact that the lotto and keno numbers are drawn without replacement makes it possible for a player to maximize his or her odds. Specifically it is possible for a player to maximize his odds by playing a plurality of non-repetitive lotto tickets, each containing different number combinations.

For several decades, it has been known that with the aid of so-called partial "wheeling" formulas, it is possible to generate a plurality of non-repetitive number sets which maximize the spread of the combination sets. To date, there have been several books and other products containing partial wheeling systems on the market. While the systems disclosed in these books are advertised as the most effective method of maximizing winning number combinations, these "partial" systems have several serious flaws. First, "partial" wheeling systems are just that, they are partial. Accordingly, they only cover a small percentage of a total number system. For example, many currently available systems wheel 12, 14 or perhaps 16 numbers. Such systems are hardly useful for the 49 number Florida or California lotteries and cover less than one-half of the numbers in the comparatively small 36 number Delaware lottery. Success with all "partial" wheeling systems is therefore wholly dependant upon the presumption that the winning numbers fall within the small grouping of preselected numbers "partially" wheeled by the player. Secondly, the "partial" systems disclosed in these products are often confusing to use and typically require the player to complete a complex number grid.

U.S. Pat. No. 4,692,863 discloses an electronic lottery number generator which generates lotto number sets utilizing a partial wheeling system. The device disclosed in U.S. Pat. No. 4,692,863 utilizes prestored sets which only utilize between 8 and 18 numbers of a 42, 46 or 49 number lottery set. The player picks his own numbers which are effectively overwritten on pre-generated and pre-stored number combination sets and copied out. The device disclosed in U.S. Pat. No. 4,692,863 exemplifies the problems associated with partial wheeling systems. This device only utilizes a portion of the numbers in the complete set (maximum of 18). The device disclosed in this patent therefore does not and cannot (and makes no claim to) guarantee that the selected lotto number combinations will provide winning combinations. Further, the device in this patent does not actually generate lotto number sets. All of the number sets are pre-generated and stored in memory.

The present invention is directed to apparatus and methods, including a unique minimization algorithm, for generating complete lottery combination sets which guarantee that a player will win at least one winning combination (at a non-jackpot prize level) with the minimum possible investment. The minimization algorithm utilizes every number in a respective lottery pool and makes it possible for players to generate complete combination sets for lotteries having any size number pool. The present invention is specifically designed to permit the player to generate complete combination sets for all lotto and keno type games such as the currently existing Pick 5, Pick 6, Pick 7, and Pick 10 games, and further provides the ability to program the system with new lotto games as they come into existence.

It is thus a principal object of the present invention to provide a device which generates winning lotto sets which guarantee a winning lotto combination for a selected sub-jackpot prize level.

It is a further object of the present invention to provide a device which generates winning lottery combinations and which utilizes every number in a respective lotto or keno number pool.

It is still a further object of the present invention to provide a device which generates winning lottery combinations with a mathematically minimum number of combinations.

It is still a further object of the present invention to provide a device which generates lotto numbers, and then stores the numbers to be printed out or transmitted via transmission lines to a remote location.

It is still a further object of the present invention to provide a device for generating lotto combinations which can be stored, transmitted, or fed into a lotto ticket generator.

It is still a further object of the present invention to provide a lotto number generator which can interface directly with a lotto ticket generator.

It is yet a further object of the present invention to provide a device which can be programmed to generate winning lottery combinations for a variety of lotto and keno games.

These and other objects of the present invention will become readily apparent from the description which follows.

SUMMARY OF THE INVENTION

In accordance with the present invention, apparatus for generating lottery combinations. The invention comprises keypad entry means for inputting a number comporting to the total size of a lottery number pool; keypad entry means for inputting a desired minimum win level; processor means utilizing a pre-stored algorithm for generating a plurality of number combinations utilizing each number of said total lottery number pool, one of said generated number combinations providing a winning combination at said minimum win level; and means for outputting and storing said number combinations.

In the method of the present invention, a number comporting to the total numbers of a lottery pool to be played is input; the beginning numbers of a number set to be played are then input; a predetermined prize level to be won is further input; further, utilizing processor means, a plurality of number combinations in accordance with a pre-stored algorithm are generated, said algorithm determining whether each said number combination matches a binomial distribution criterion and further determining whether each said number combination meets a comparison criteria fixed to said predetermined prize level with respect to previously selected number combinations so as to guarantee a winning combination at a predetermined prize level; and outputting said selected number combinations.

BRIEF DESCRIPTION OF THE FIGURES

FIG. 7 is a complete 30 number 3 out of 6 lottery set generated in accordance with the present invention having a mean binomial distribution value of 93.

FIG. 17 illustrates the loop by which numbers are generated in the present invention.

FIG. 18A illustrates a PICKSEED array as utilizied in the present invention

FIG. 18B illustrates the PICK(S) array as utilized in the present invention.

FIG. 18C illustrates a method by which the PICKSEED array compares to PICK(S) array in the present invention.

DETAILED DESCRIPTION OF THE PREFERRED EMBODIMENT

Figure 1:
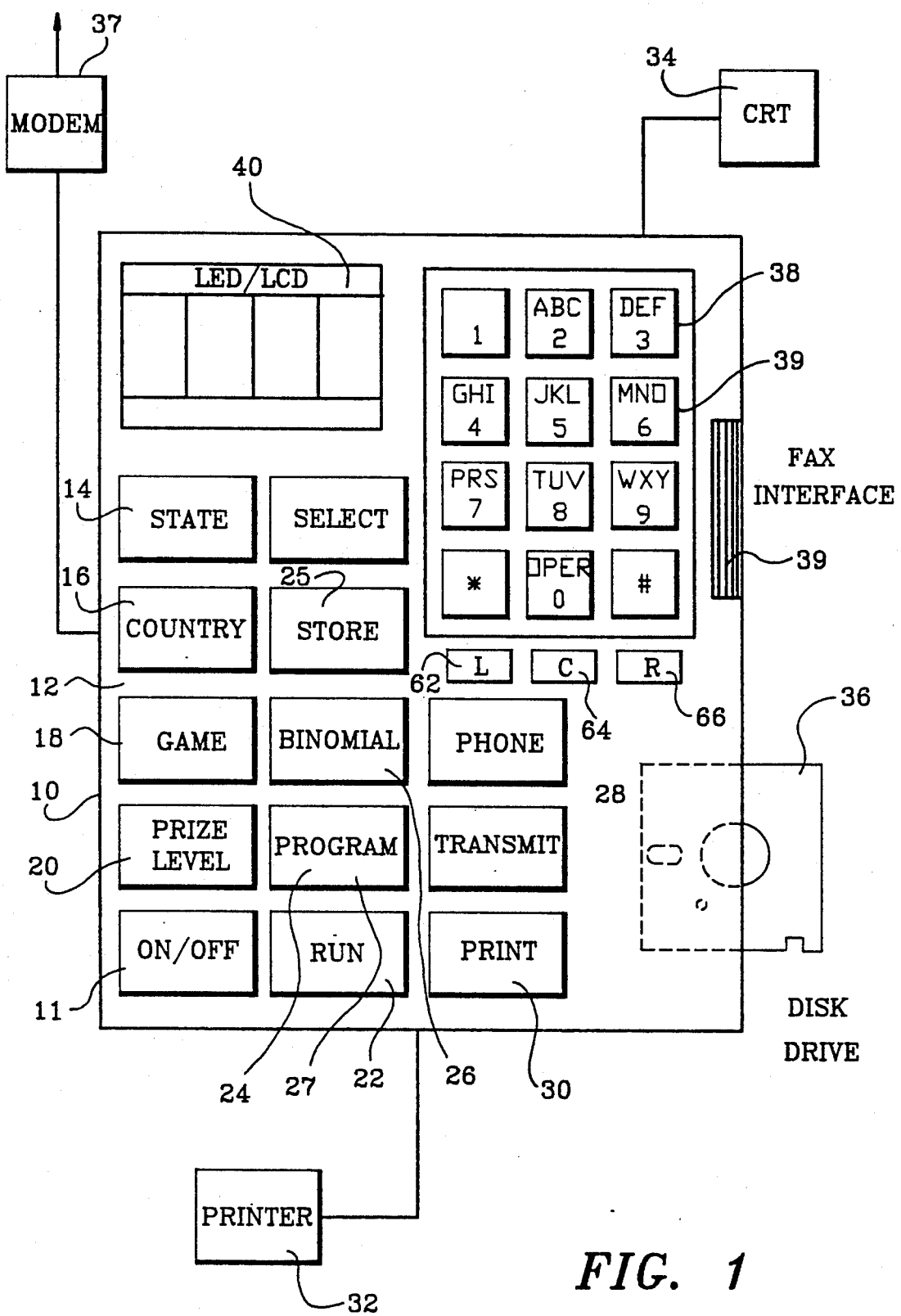
FIG. 1 is a plan view of an electronic device for generating complete lotto number combinations in accordance with the present invention.

The present invention is described with reference to the attached Figures wherein the same numbers are utilized where appropriate. Referring to FIG. 1, a preferred lotto number generator 10 of the present invention is shown. The generator comprises a keyboard entry system 12 for entering a set of data entries necessary for generating winning lotto and keno combinations. The keyboard entry system includes an ON/OFF switch 11 as well as inputs for the STATE 14, COUNTRY 16, GAME 18, and the desired PRIZE LEVEL 20 to be won. The device further includes keypad RUN 22, PROGRAM 24 and STORE 25 entry pads as well as an entry pad for inputting the binomial distribution BINOMIAL 26. The keypad entry device further includes PROGRAM 27 and SELECT 17 keys. The keypad entry system also includes keypad entries for a PHONE/FACSIMILE 28, PRINTER 30 or MAGNETIC STORAGE DEVICE 36. Several alternative output devices including a printer 32, CRT monitor 34, disk drive (3.5 or 5.25 inch) 36, modem 37 and facsimile interface 39 are also included.

The keypad entry system has numerical entry pads numbered 0-9 38. These entry pads may serve as a telephone pushbutton entry device 39 which can function to facilitate both modem and facsimile transmission. The device further includes an LED or LCD output display 40.

Figure 2:
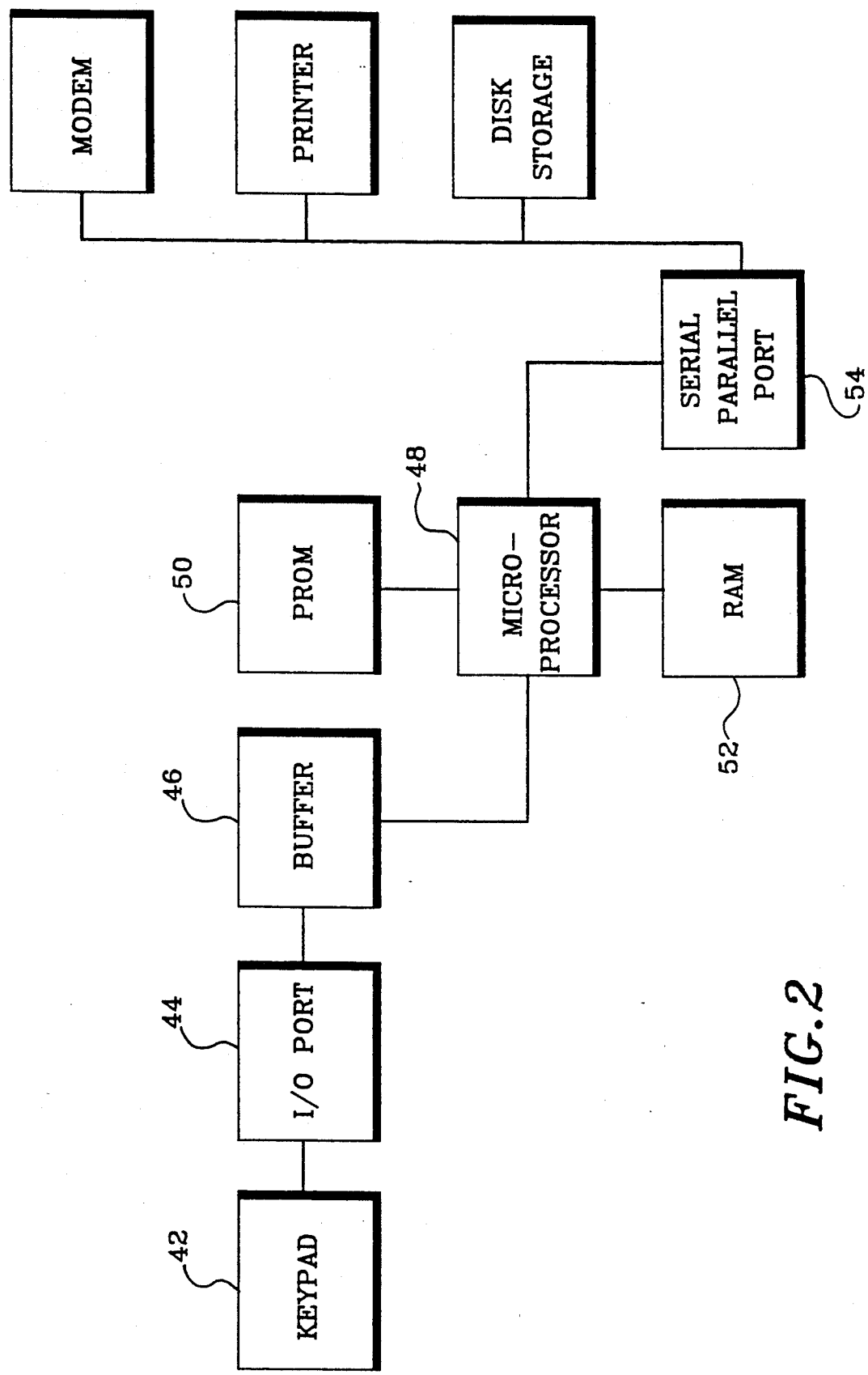
FIG. 2 is a block diagram of the electronic device for generating combinations in accordance with the present invention.
Figure 6:
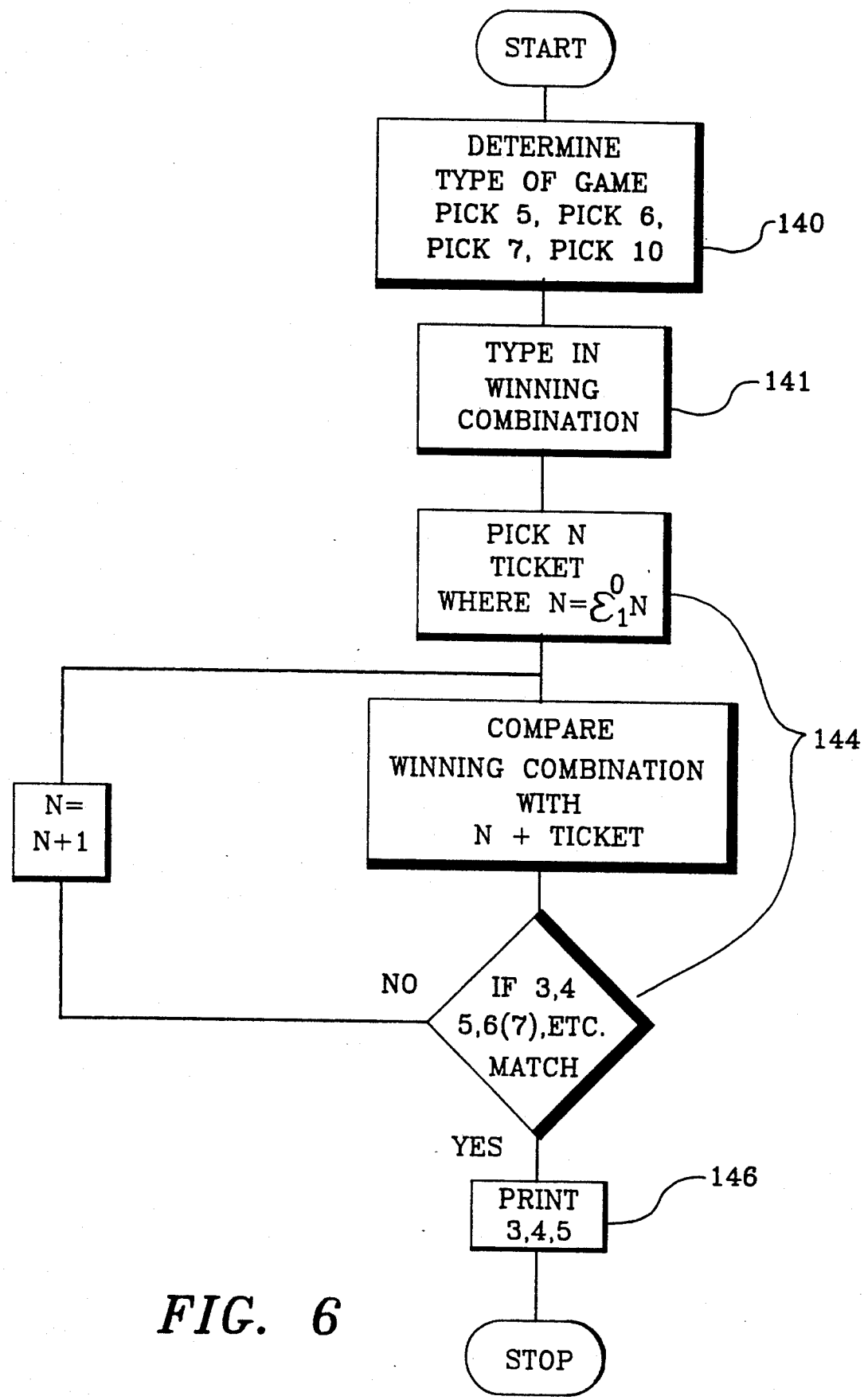
FIG. 6 is an algorithmic representation of the MATCH algorithm as utilized in the present invention.

FIG. 2 illustrates a block diagram of the internal operation of the device of the present invention. As shown, a signal from keypad 42 is fed to I/O Port 44, through buffer 46 and to microprocessor 48. The device includes a PROM 50 and active memory (RAM) 52. The programmable memory 50 stores a set up algorithm as well as the main algorithms which generate the complete number sets of the present invention. The PROM 50 further stores a MATCH algorithm (See FIG. 6) which enables the player to determine which generated combinations constitute winning combination(s) for a particular drawing. Output from the microprocessor 48 feeds to Serial/Parallel Port 54 and to an output device.

The present invention may be used with a variety of microprocessors or central processing units. However, it is recommended that the present invention be utilized with a CPU or microprocessor having a speed of at least 1 MIP (Millions of Instructions per Second) such as an Intel 8088, 80286 and preferably an 80386 or 80486 or X86 with Weitek 1167 or 3167 co-processor operating under the MS-DOS operating system. While the system of the present invention has been disclosed in the context of an Intel or compatible microprocessor running on the MS-DOS operating system, it is to be appreciated that the present invention may be utilized on computer systems running on any currently available operating system such as DOS, UNIX, ZENIX, OS-2, VMS, etc. The active memory (RAM) 52 preferably should have a storage capacity of at least 8 Megabytes MB.

Figure 3:
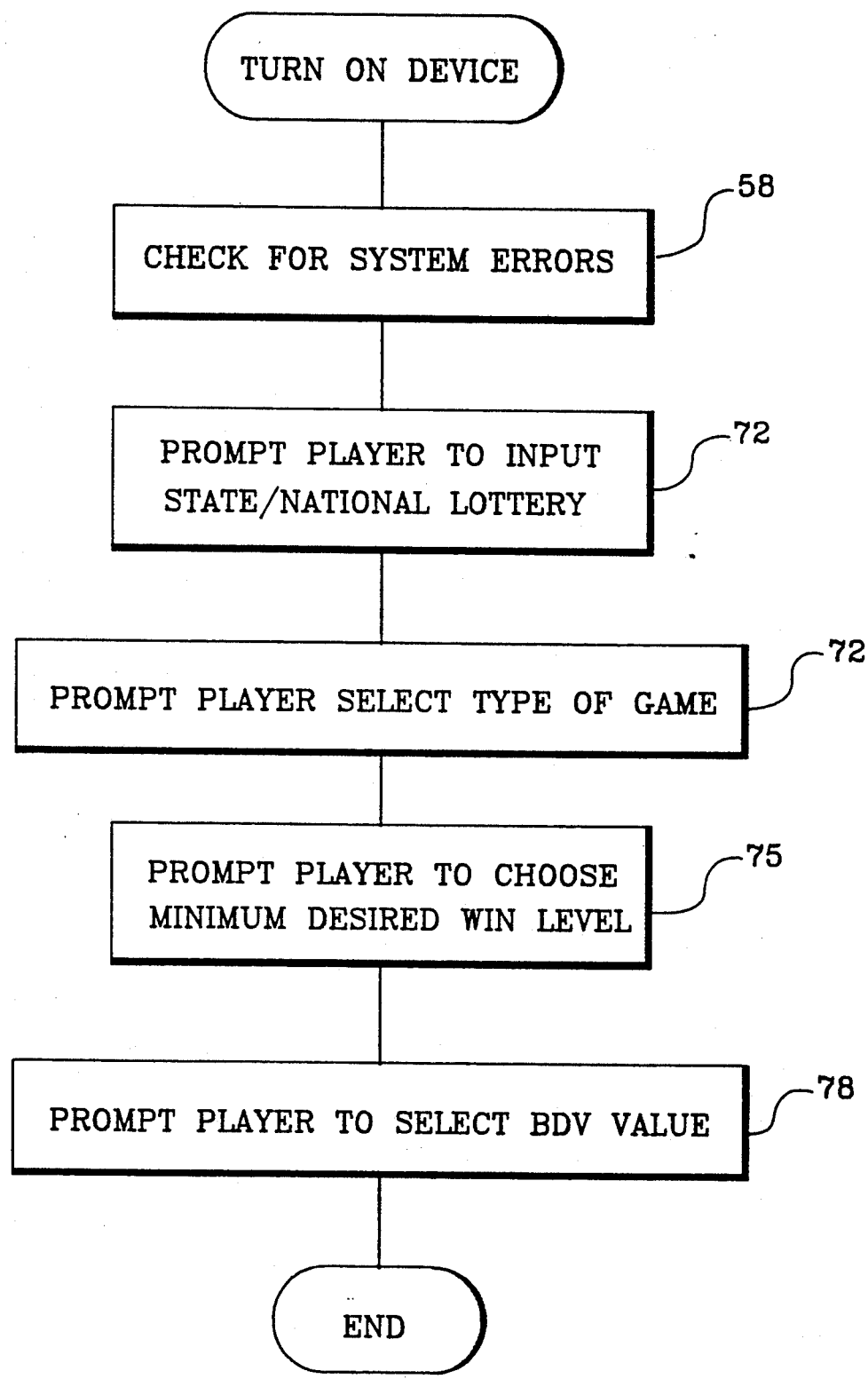
FIG. 3 is an algorithmic flow chart of the start up computer algorithm of the, apparatus of the present invention.
Figure 4:
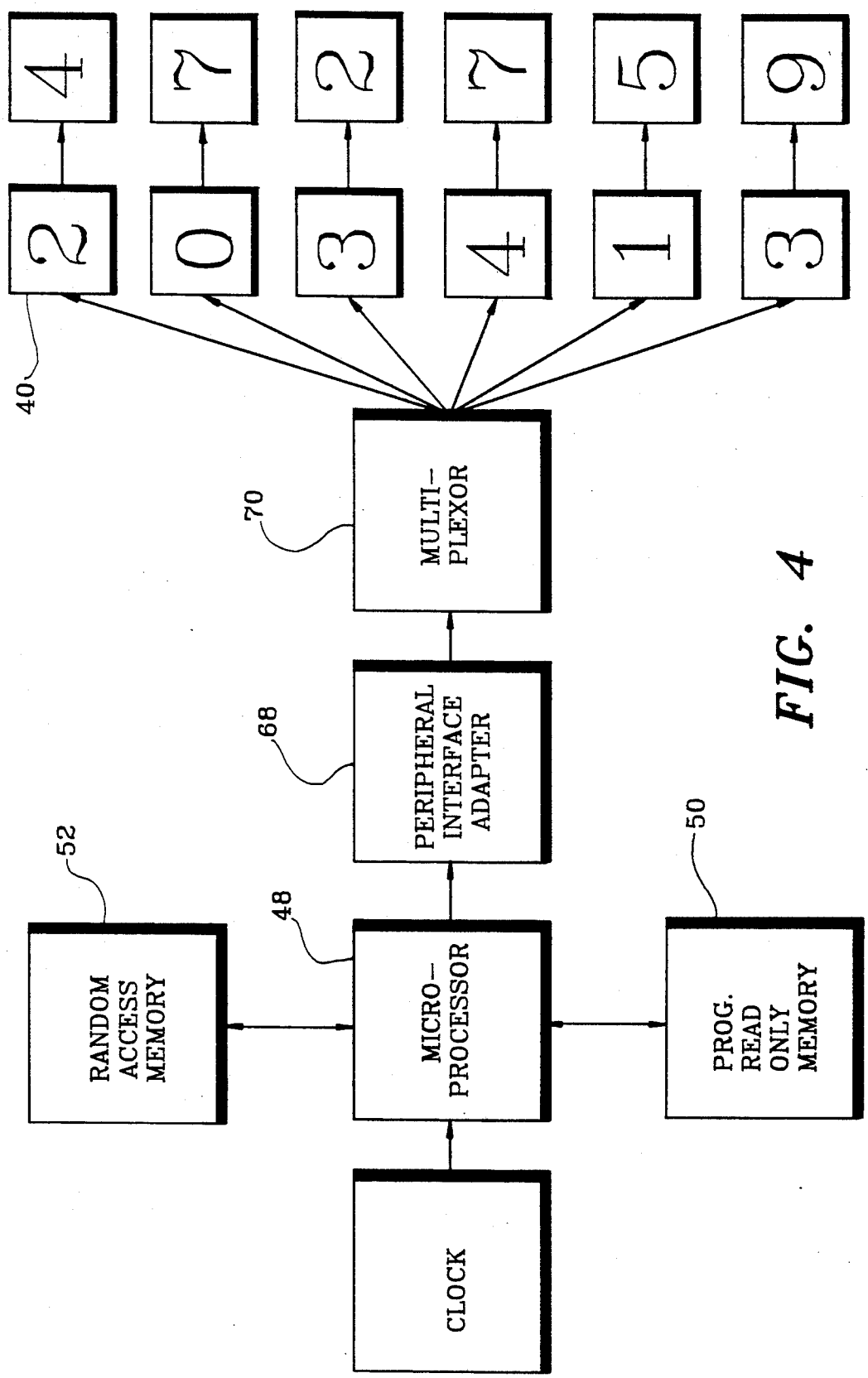
FIG. 4 is a block diagram of an output circuit which may be utilized for outputting data on an LED/LCD readout or CRT monitor utilized with the apparatus and method of the present invention.

As noted above, the present invention operates under the control of several pre-stored computer programs. In operation, a first program, set forth in FIG. 3, is utilized to enter and set up the variable parameters utilized by the main programs. The nature of the program is conventional and may be easily microprogrammed by those skilled in the art. Initially, after checking for system errors 58, the set-up program is utilized to identify the state or national lottery which the player desires to play 60. This data can be input using one of several alternative methods. First, the state and provincial postal codes (e.g. PA, B.C.) can be pre-stored in PROM 50 and merely scrolled on the LCD/LED 40 or CRT monitor 34. Second, the player can type in the two letter postal abbreviation of the state or province, or other predetermined identification code. Letters may be typed in by pressing the left 62, center 64, or right 66 keys and simultaneously hitting the numerical telephonic keypad 39 containing the appropriate letter. For example, to load in Pennsylvania (PA), the player would simultaneously hit L-7 and then L-9; New York (NY) would require the simultaneous contact of C-6 and then R-9. In addition, the country code entry key enables the player to pick a particular international lottery. As noted above, FIG. 3 illustrates the type of conventional keypad circuitry which can be utilized to effectuate data entry for the present invention. FIG. 4 illustrates conventional output circuitry for driving the LED/LCD display 40 or CRT monitor 34. This circuitry includes a Peripheral Interface Adapter (PIA) 68 and Multiplexer 70.

After the state (or country code) is input, the initial program will prompt the player to choose one of the games offered by that state or country 72 which will be pre-programmed into the system. For example if MA (Massachusetts) is input, the player will be prompted to choose either the 6/36 or 6/46 ("MASS Millions") number game. Next, the player will be prompted to choose which prize level he desires 75 (e.g. 3 out of 6; 4 out of 6; 3 out of 5, etc.) depending upon the state and type of lottery selected). Finally, the player will be prompted to insert a binomial distribution value BDV for the particular number set 78.

Figure 5:
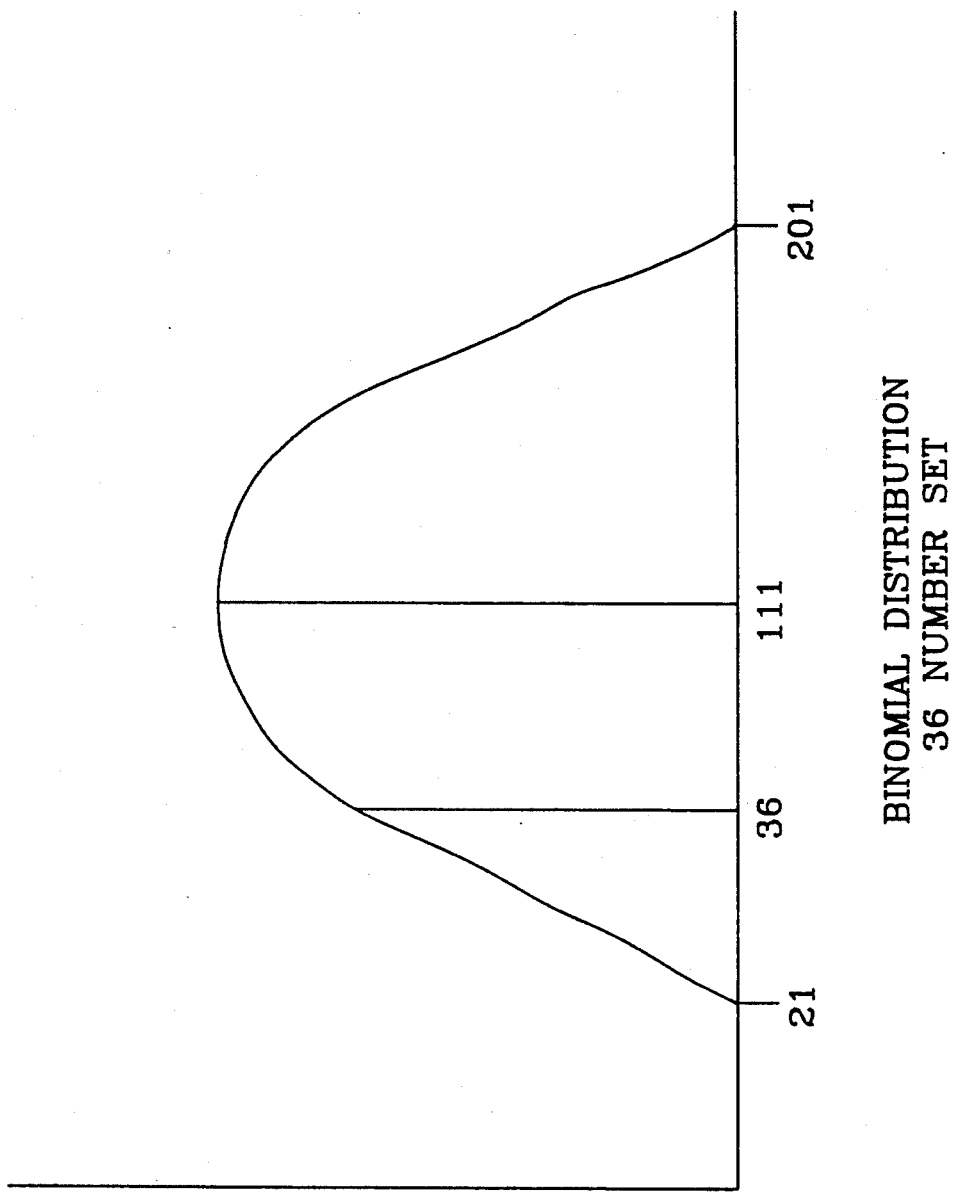
FIG. 5 is a graph which illustrates the binomial distribution of a 36 number set as utilized in the present invention.

The binomial distribution is a key element in the operation of the present invention. The binomial distribution is a statistical variable which represents the sums of the digits from the first to the last combination of any number set. For example, for a thirty six number set (i.e. a number set containing 36 numbers from 1-36), the binomial minimum representing the sum $1+2+3+4+5+6$ equals 21. The binomial maximum sum is $36+35+34+33+32+31$ equalling 201. The range of binomial sums for a 36 number set thus falls between 21 and 201. FIG. 5 illustrates this concept in the context of a 36 number set. The mean of the set is $21+201$ divided by 2, or 111. As will be extensively discussed herein, a preselected binomial distribution for each particular number set may be utilized to minimize the number of combinations required to guarantee a winning combination set for a particular lottery pool size and prize level.

The main algorithms of the present invention and their operation are now described with reference to FIGS. 10-18 and Appendix A. The algorithms are stored in PROM 50 and are utilized in conjunction with initial variables input in accordance with the above described set up algorithm. These main algorithms generate pluralities of number combinations which guarantee the user at least one winning lotto or keno combination for the particular sub-jackpot prize level and game selected.

Figure 10:
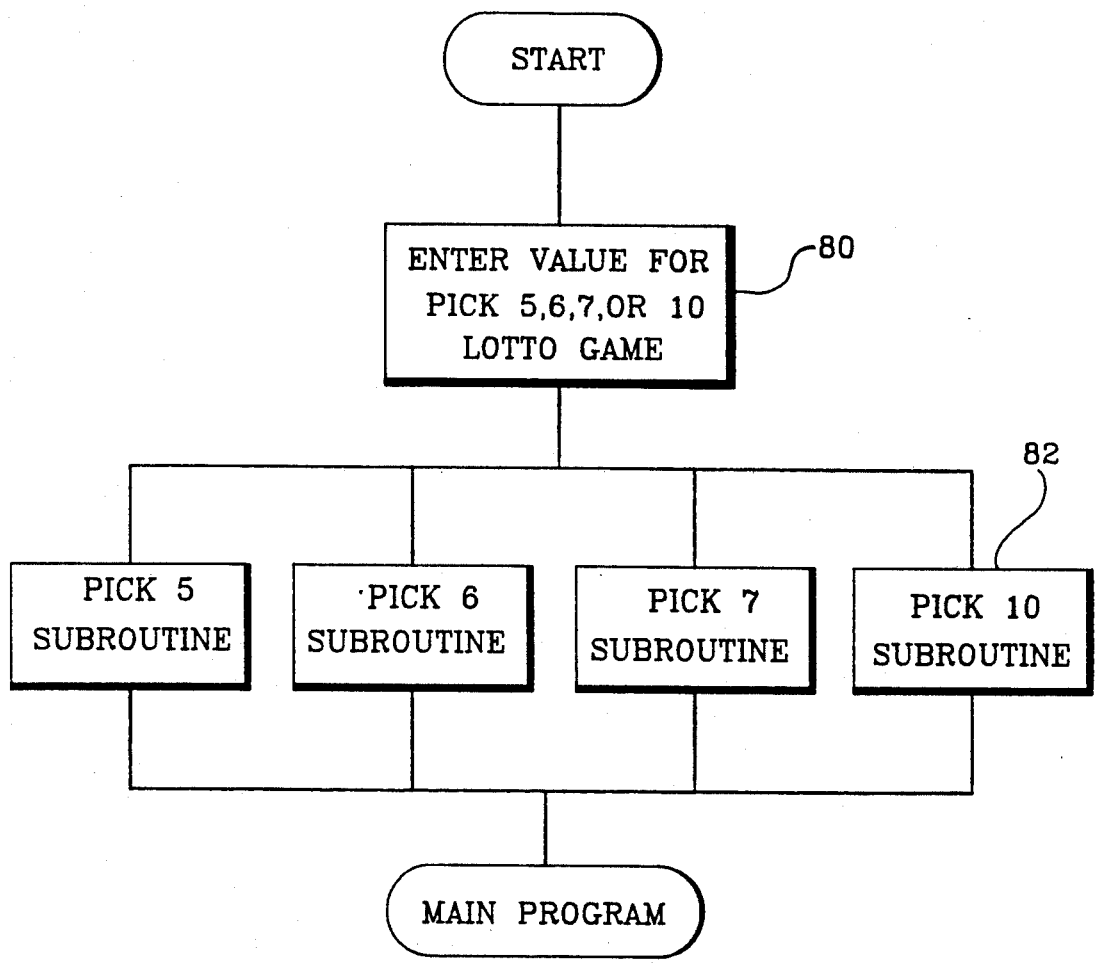
FIG. 10 is an overall block diagram of the computer algorithms of the present invention.

The algorithms may be programmed in any currently available higher level language such as FORTRAN, WATFIV, PASCAL and C. Appendix A, appearing at the end of the specification, represents a printout of the algorithms of the present invention for Pick 5, Pick 6 and Pick 7 lotteries programmed in FORTRAN, and is enclosed for the convenience of those skilled in the art. Referring to FIG. 10, the algorithm initially requires that the player identify whether the selected game is a Pick 5, Pick 6, Pick 7 or Pick 10 lottery 80. Next, the algorithm proceeds to the appropriate subroutine corresponding to the type of lotto or keno game selected (i.e. Pick 5, Pick 6, etc.) 82. Within each of these subroutines, the algorithm initially inputs the size of the lottery pool (RAYMAX) e.g. 49, 46, 42, 40, etc 84. This data is entered by the user during the running of the set-up program, discussed above. For purposes of this example, it is assumed that there are 40 numbers in the lottery pool and that accordingly RAYMAX=40. Next, the algorithm inputs the value of the minimum desired value MIV to be won, e.g. "3" for 3/5 or "4" for 4/6 86. The algorithm then inputs the binomial distribution value BDV 90. The binomial distribution value may be set equal to any value or, alternatively, be configured to input a set value depending upon the values of MIV and RAYMAX.

Figure 12:
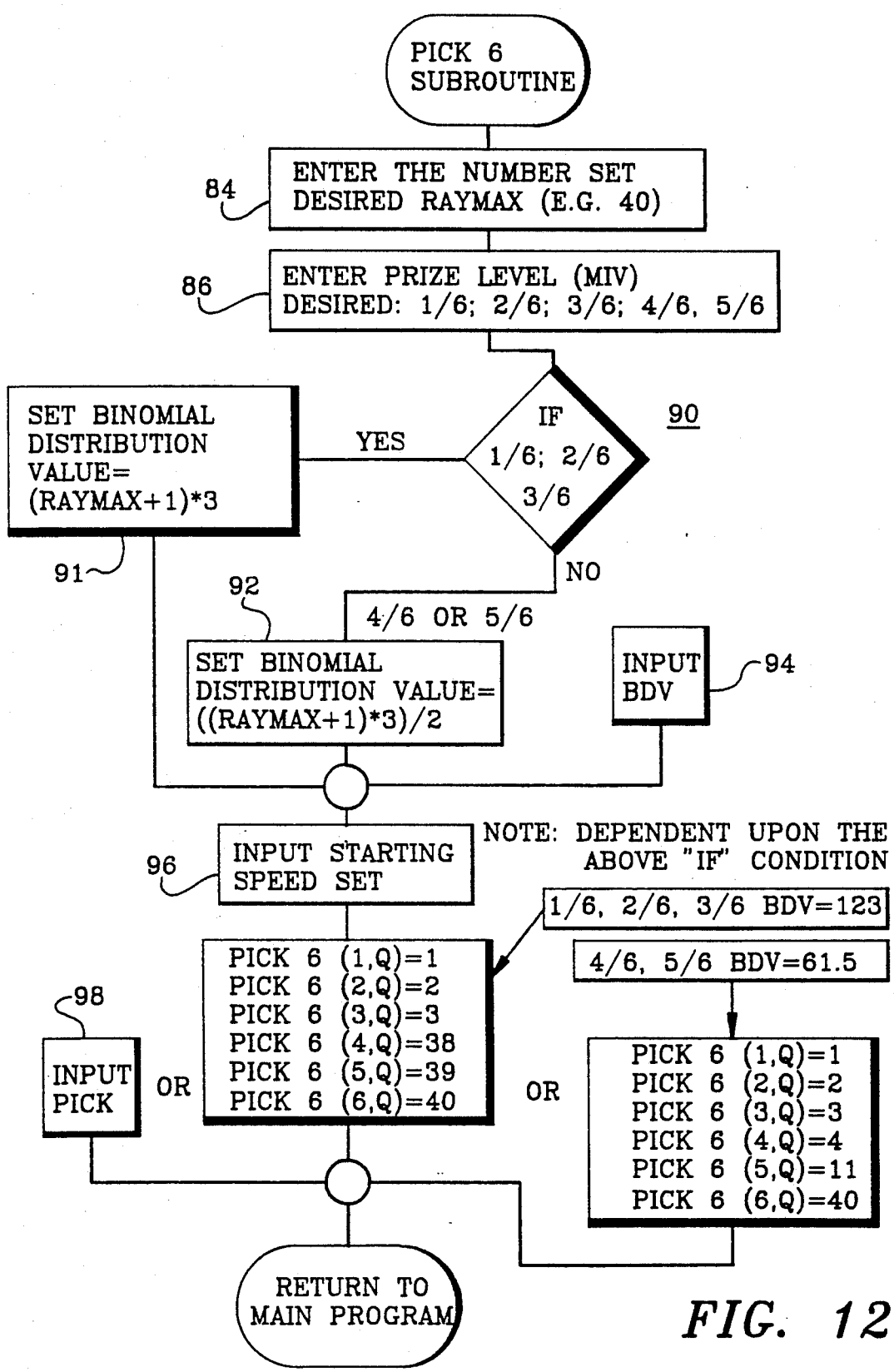
FIG. 12 an algorithmic representation of the Pick 6 subroutine utilized in the present invention.

Formulae for calculating the binomial distribution value required to provide a minimized number of combinations have been determined empirically. As shown in FIG. 12, for Pick 6 lotteries, in which an MIV or 1, 2, or 3 (i.e. 1/6, 2/6 or 3/6) is desired, the BDV is determined utilizing the formula:

$$BDV=(RAYMAX+1) \times Z \ 91$$

where Z equals the jackpot level (6) divided by 2 (3). It will be apparent to those skilled in the art that this value corresponds to the average BDV of the number set. For the case of a 4/6 or 5/6 combination (MIV=4, 5), the BDV is calculated using the formula:

$$BDV=((RAYMAX+1) \times Z)/2 \ 92.$$

It is to be stressed that the BDV value is always rounded down to the closest integer value. Thus, the BDV 61.5 for the 4/6 and 5/6 sets, calculated above, is rounded down to 61. Alternatively, the player may program in any arbitrary BDV value 94. However, in such a situation, the size of the resultant combination set will not be minimized.

The subroutine then selects a starting number combination PICK 96. The starting number combination is preferably the first number in the set which matches the BDV criteria. However, the player may key in an arbitrary number combination to serve as the staring PICK 98, even a value which is mathematically impossible (such as a value below 21 in a Pick 6 lottery).

Figure 11:
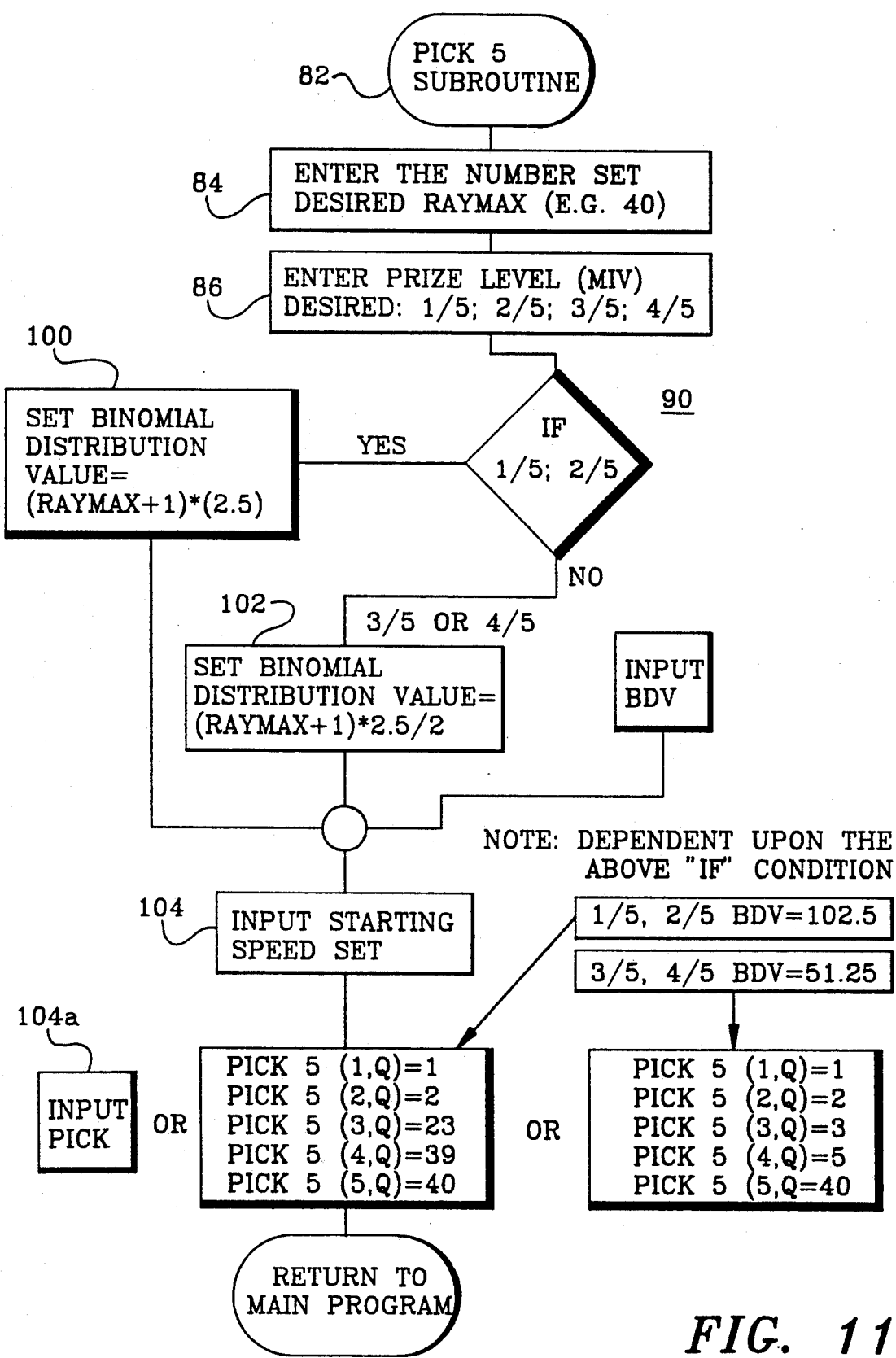
FIG. 11 is an algorithmic representation of the Pick 5 subroutine utilized in the present invention.

The Pick 5 subroutine, illustrated in FIG. 11, is similar to the Pick 6 subroutine. As with the Pick 6 subroutine, the algorithm initially inputs the size of the number set RAYMAX 84 (e.g. 40) and the desired prize level MINVAL 86, e.g. 1/5, 2/5, 3/5, 4/5. If the value of MINVAL is 1/5 or 2/5 (1,2), the BDV is determined by the formula:

$$BDV=(RAYMAX+1) \times Z \ 100.$$

It will be apparent that this value corresponds to the average BDV for the number set. For a 3/5 or 4/5 combination (MIV=3 or 4), the value of BDV is determined using the formula:

$$BDV=((RAYMAX+1) \times Z)/2 \ 102.$$

As with the Pick 6 subroutine, any arbitrary BDV value can be selected. Moreover, as with the Pick 6 subroutine, after the BDV value is input, an initial seed number PICK 104 is input. This number may represent an initial value which meets the BVD criterion or an arbitrary number 104a.

Figure 13:
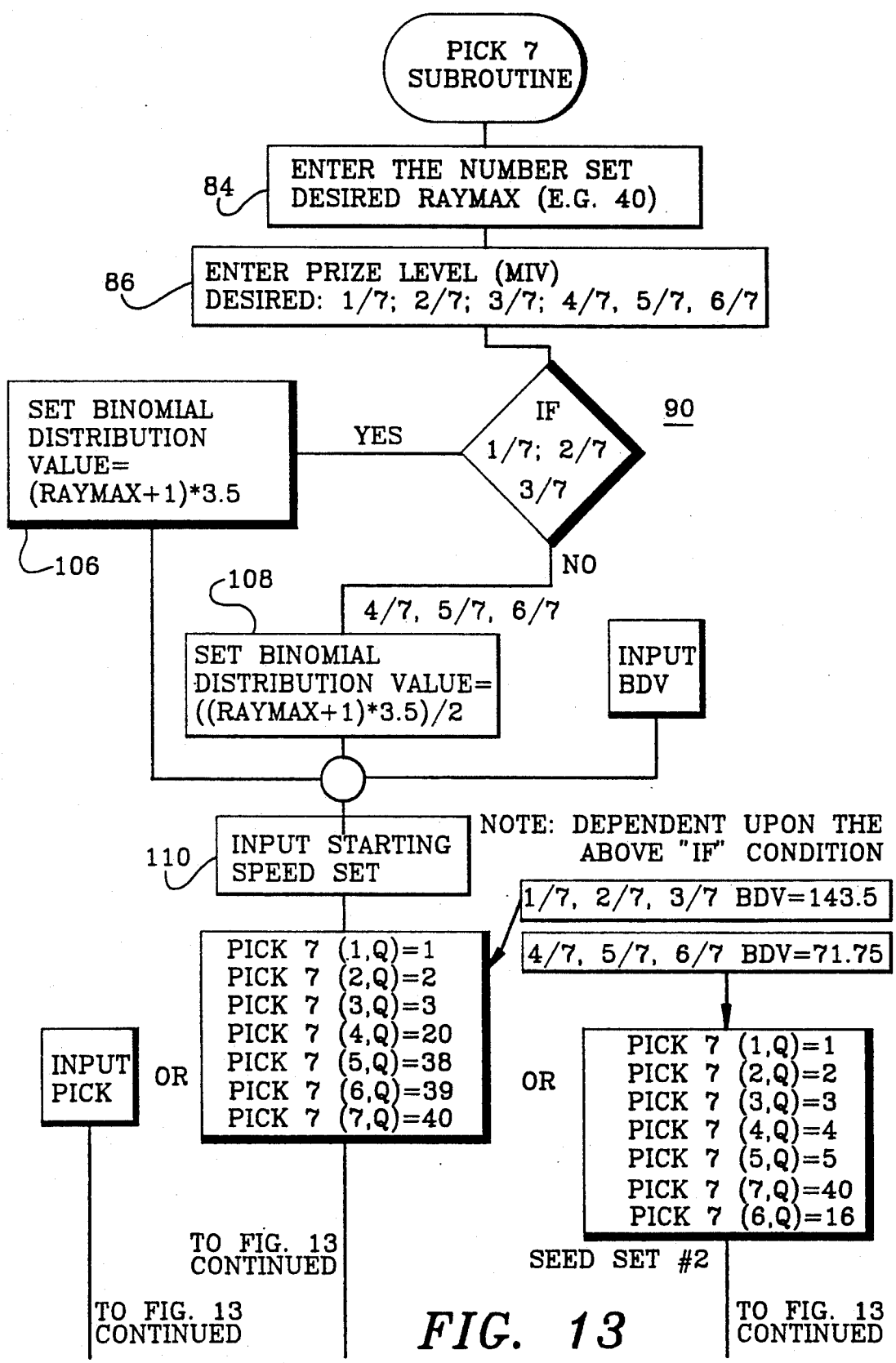
FIGS. 13 and 13A are an algorithmic representation of the Pick 7 subroutine utilized in the present invention.
Figure 13:
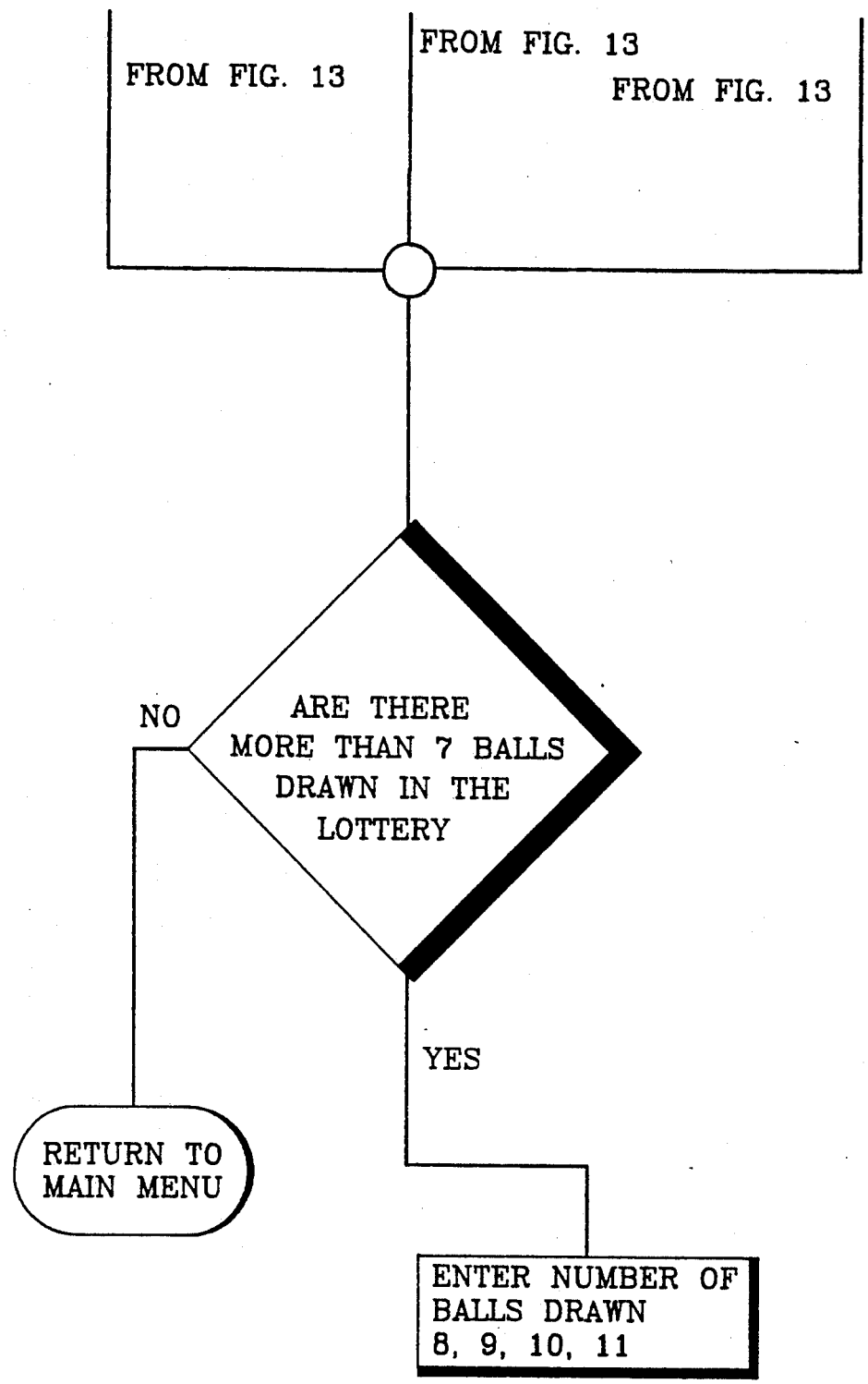

The Pick 7 subroutine is set forth in FIG. 13. As with the previous routines, the size of the number set RAYMAX 84 is entered (e.g. 40). Next, the minimum desired prize level MINVAL 86 is input. If a 1/7, 2/7, or 3/7 winning combination is desired, BDV is set by the formula;

$$BDV=(RAYMAX+1) \times Z \ 106.$$

If a 4/7, 5/7 or 6/7 prize is desired (MINVAL=4, 5, or 6), the value of BDV is determined by the equation:

$$BDV=((RAYMAX+1) \times Z)/2 \ 108.$$

The initial seed number PICK 110 is then input. As with the Pick 5 and Pick 6 number sets, the initial seed may be the first number which matches the BDV criterion or an arbitrary number combination.

Figure 13A:
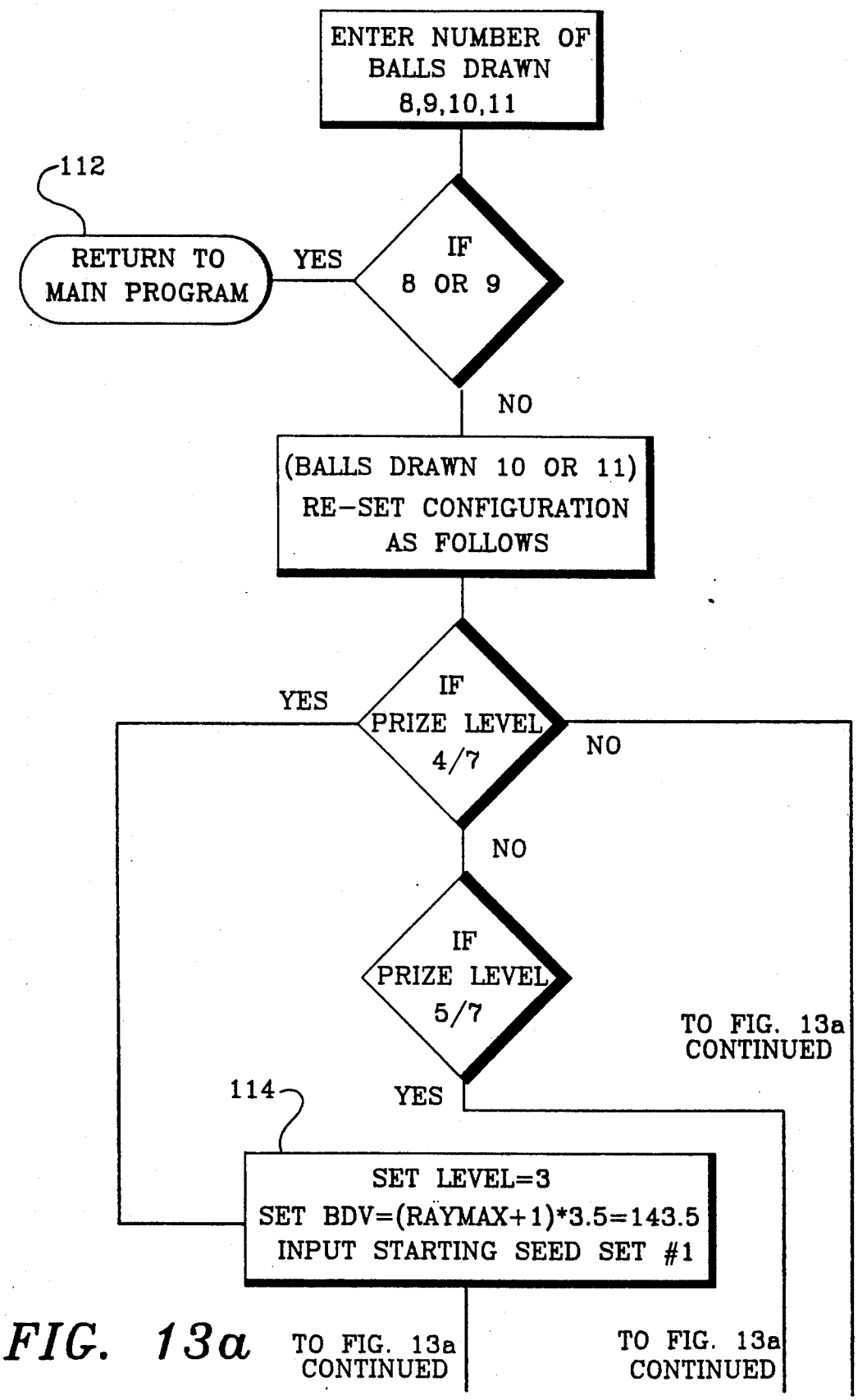
Figure 13A:
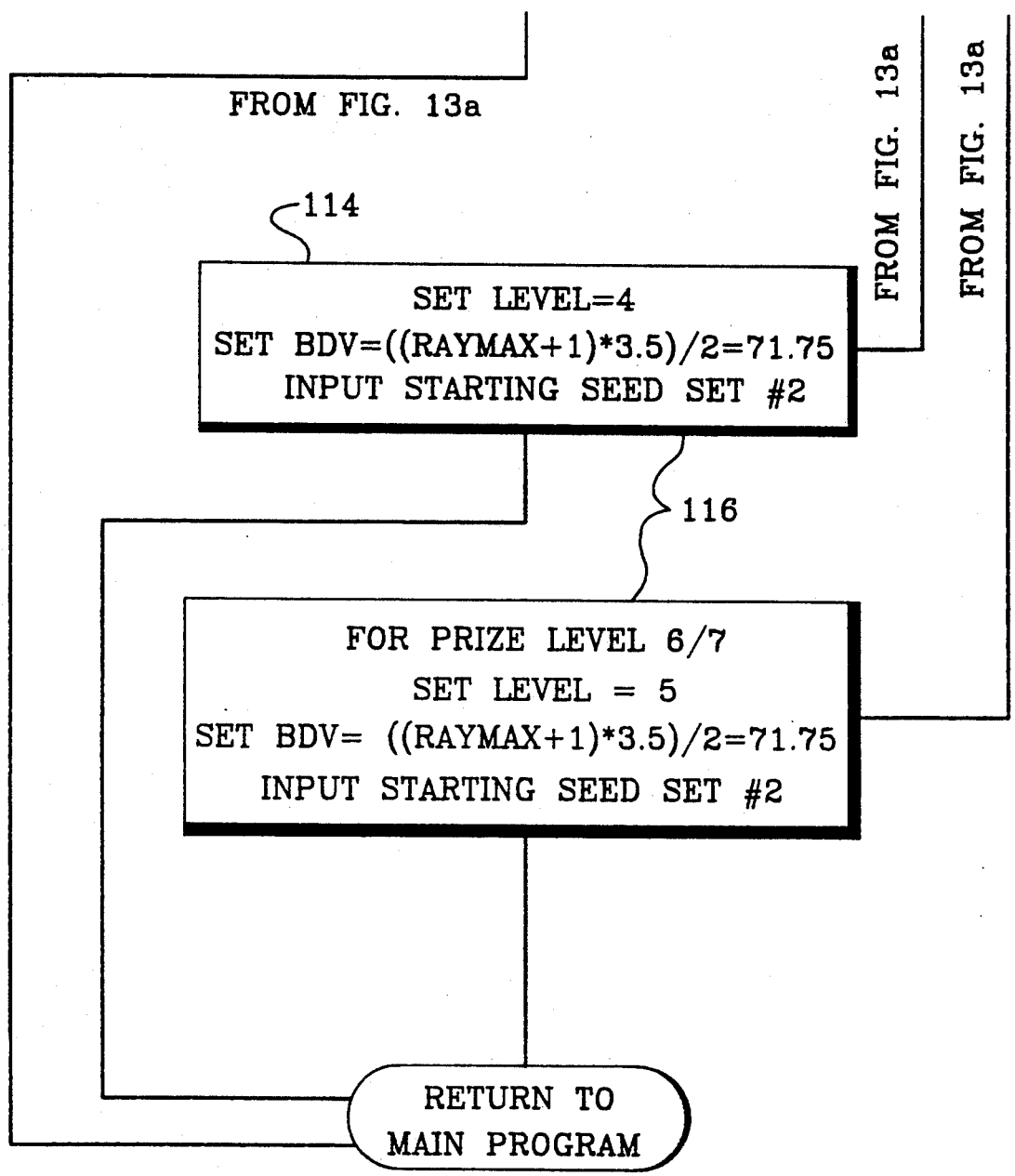

In case of a Pick 7 set, it must then be determined whether more than 7 balls are drawn. (Several states and provinces such as Pennsylvania [See Background of Invention] sponsor Pick 7 lotteries in which more than seven balls are drawn). Referring to FIG. 13A, if 8 or 9 balls are drawn, the program returns to the main program 112. If 10 or 11 balls are drawn, the program proceeds through the routine of FIG. 13A. For the 4 out 7 level, the BDV is calculated by the equation:

$$BDV=(RAYMAX+1) \times Z \ 114.$$

For the 5 and 6 out of 7 levels, the BDV is set by $$BDV=((RAYMAX+1) \times Z)/2 \ 116.$$

As with the Pick 5 and Pick 6 number sets, an arbitrary BDV value can be chosen by the player.

Figure 14:
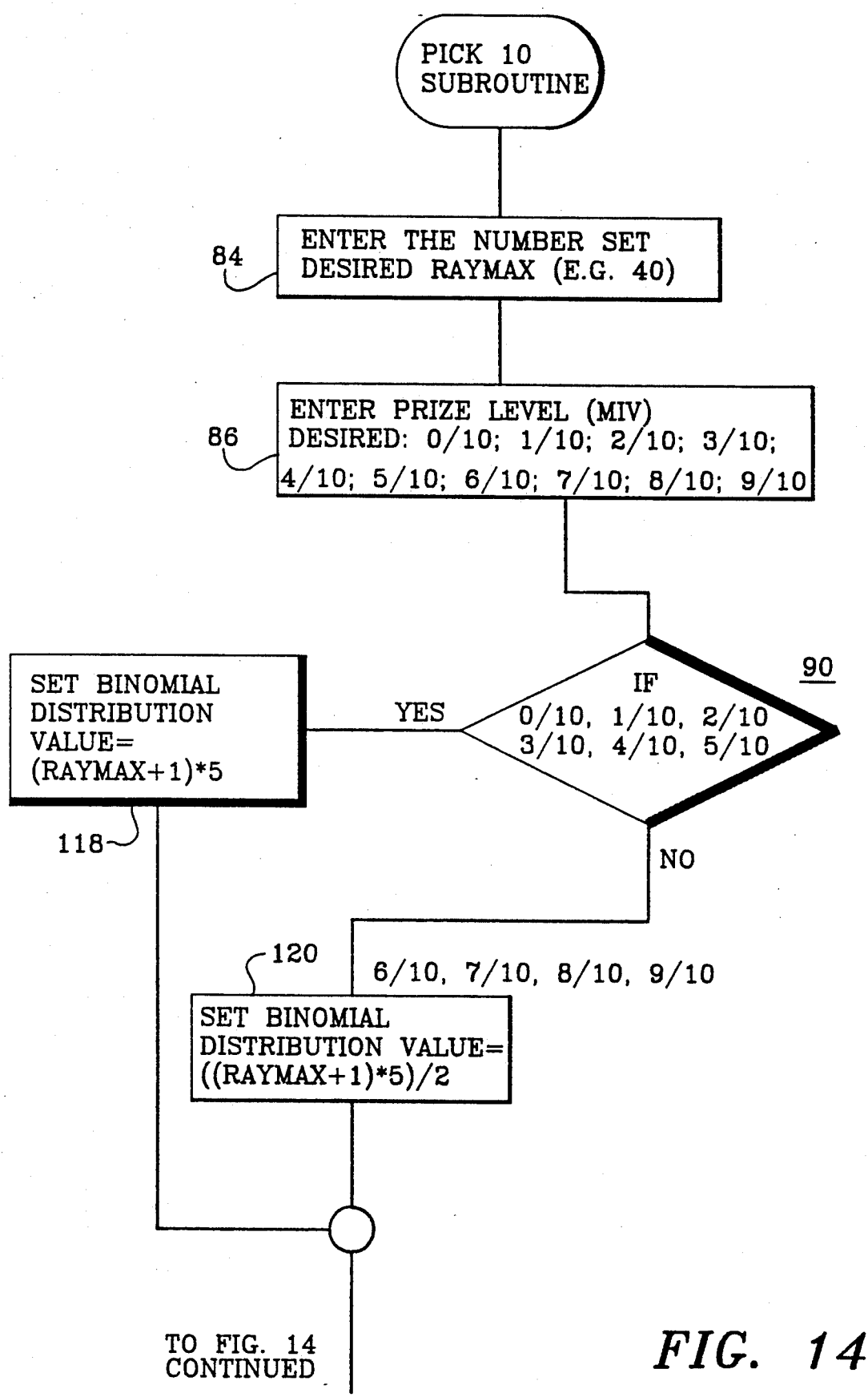
FIG. 14 is an algorithmic representation of the Pick 10 subroutine utilized in the present invention.
Figure 14:
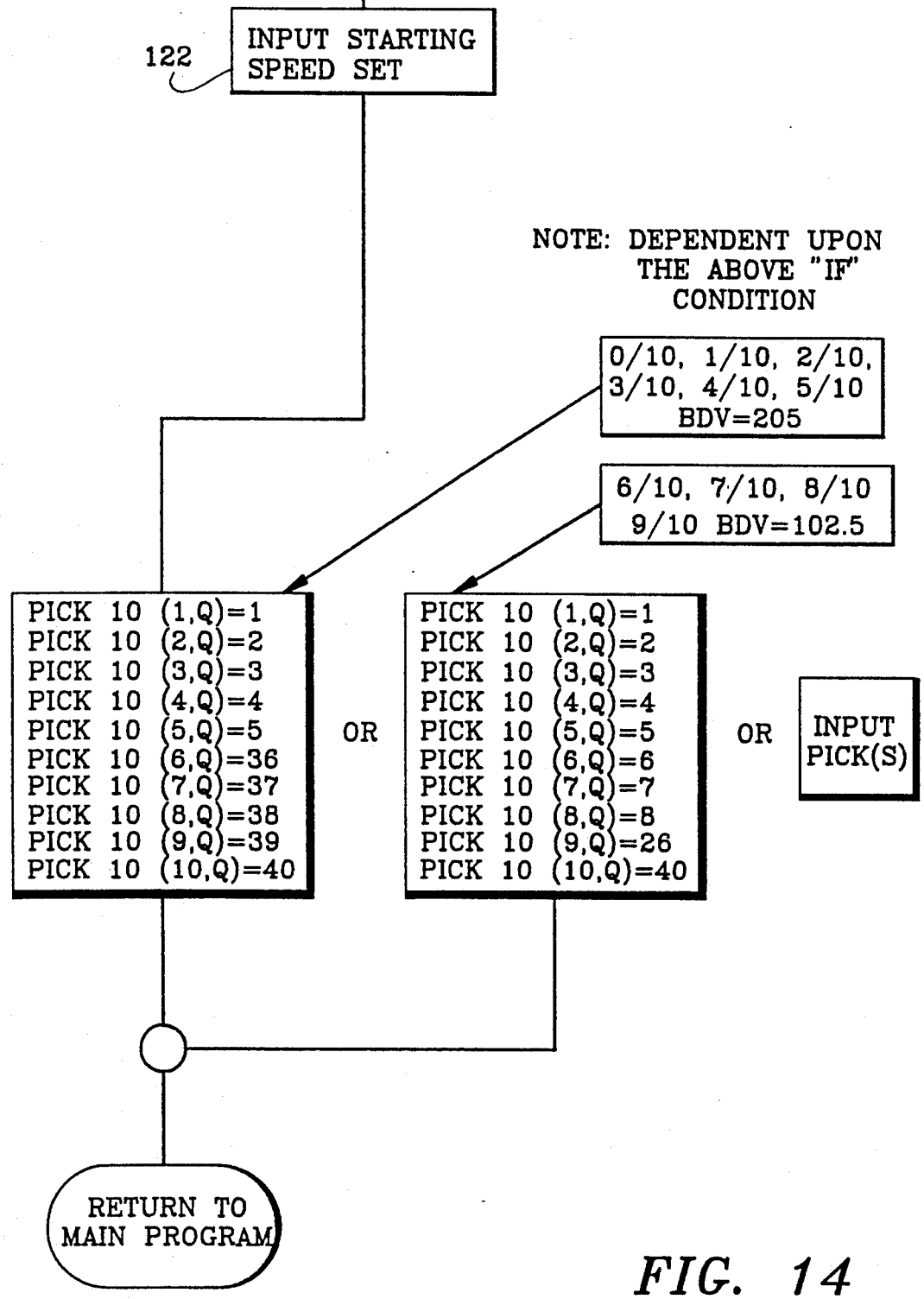

Finally, FIG. 14 illustrates a Pick 10 subroutine. As with the Pick 5, 6, and 7 subroutines, the size of the number set (RAYMAX) 84 is entered (e.g. 40) along with MIV 86. If a 0, 1, 2 3, 4, or 5 out of 10 winning combination is desired (MIV=0-5), the BDV is set by the equation:

$$BDV=(RAYMAX+1) \times Z. \ 118$$

If a 6, 7, 8, or 9 out of 10 winning combination is desired, the value of BDV is set by the equation:

$$BDV=((RAYMAX+1) \times Z)/2 \ 120.$$

As with all previous subroutines, the starting seed PICK 122 is input. The starting seed number can correspond to the first number which fulfills the BDV requirement. Alternatively an arbitrary number can be inserted.

After the values of BDV and the initial PICK are determined, the algorithm then proceeds to a main routine which varies according to whether the lotto game to played is a Pick 5, 6, 7 or 10 type game. The main routines for the Pick 5, 6, and 7 lotteries are set out in FIGS. 16A-16C and Appendix A.

Figure 16A:
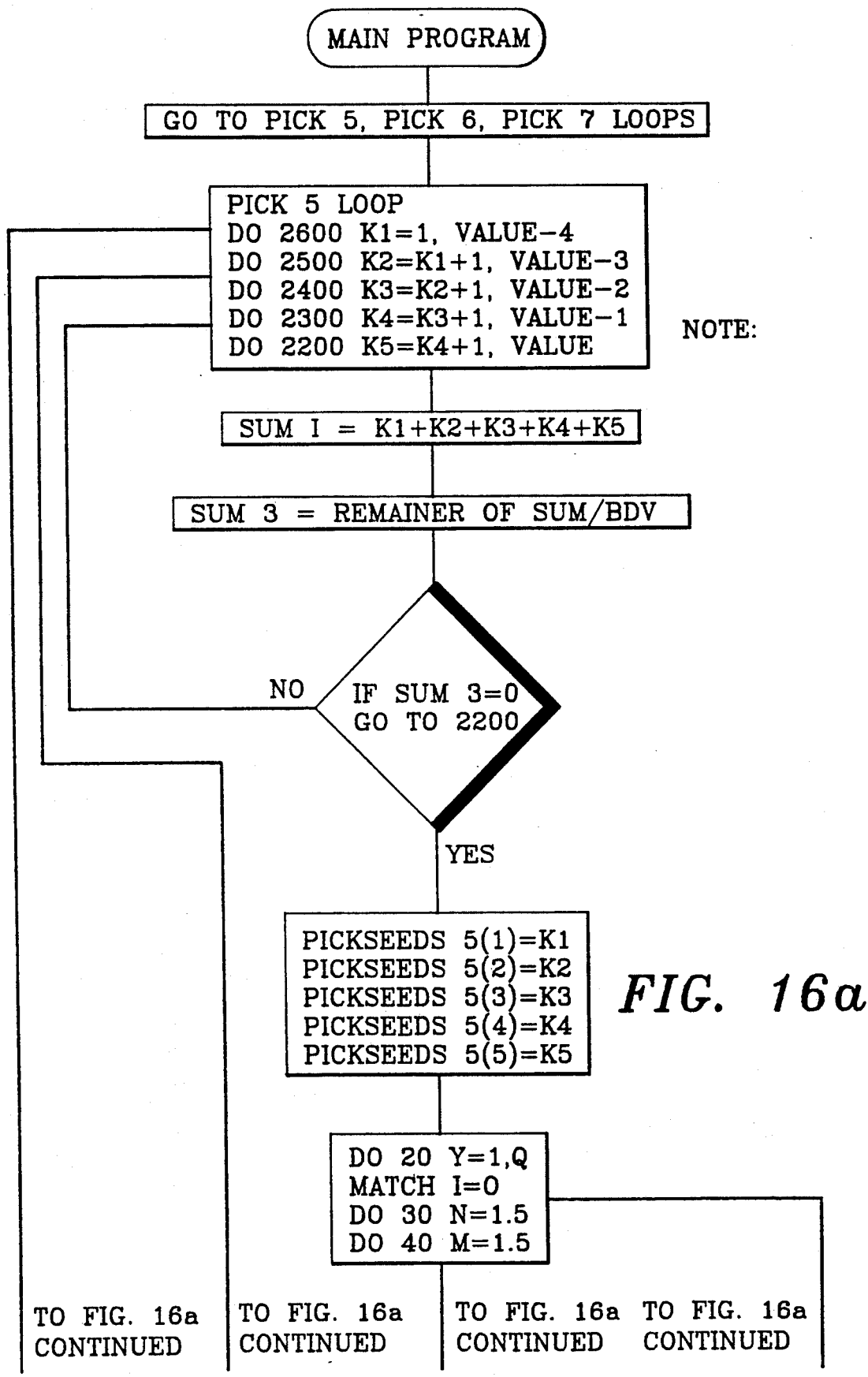
FIGS. 16A-16C are algorithmic representations of the main programs for the Pick 5, Pick 6 and Pick 7 lotto sets.
Figure 16A:
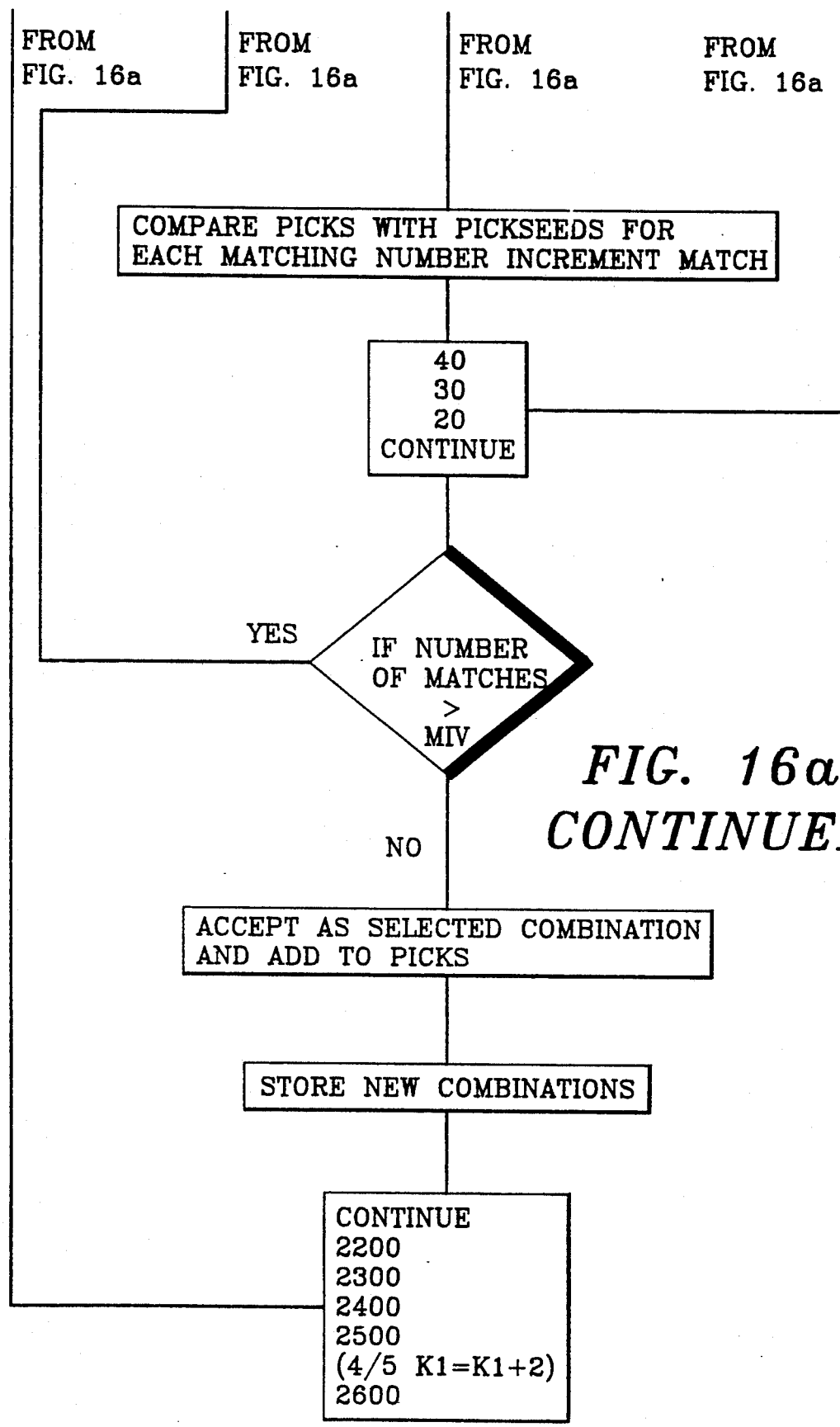
Figure 16B:
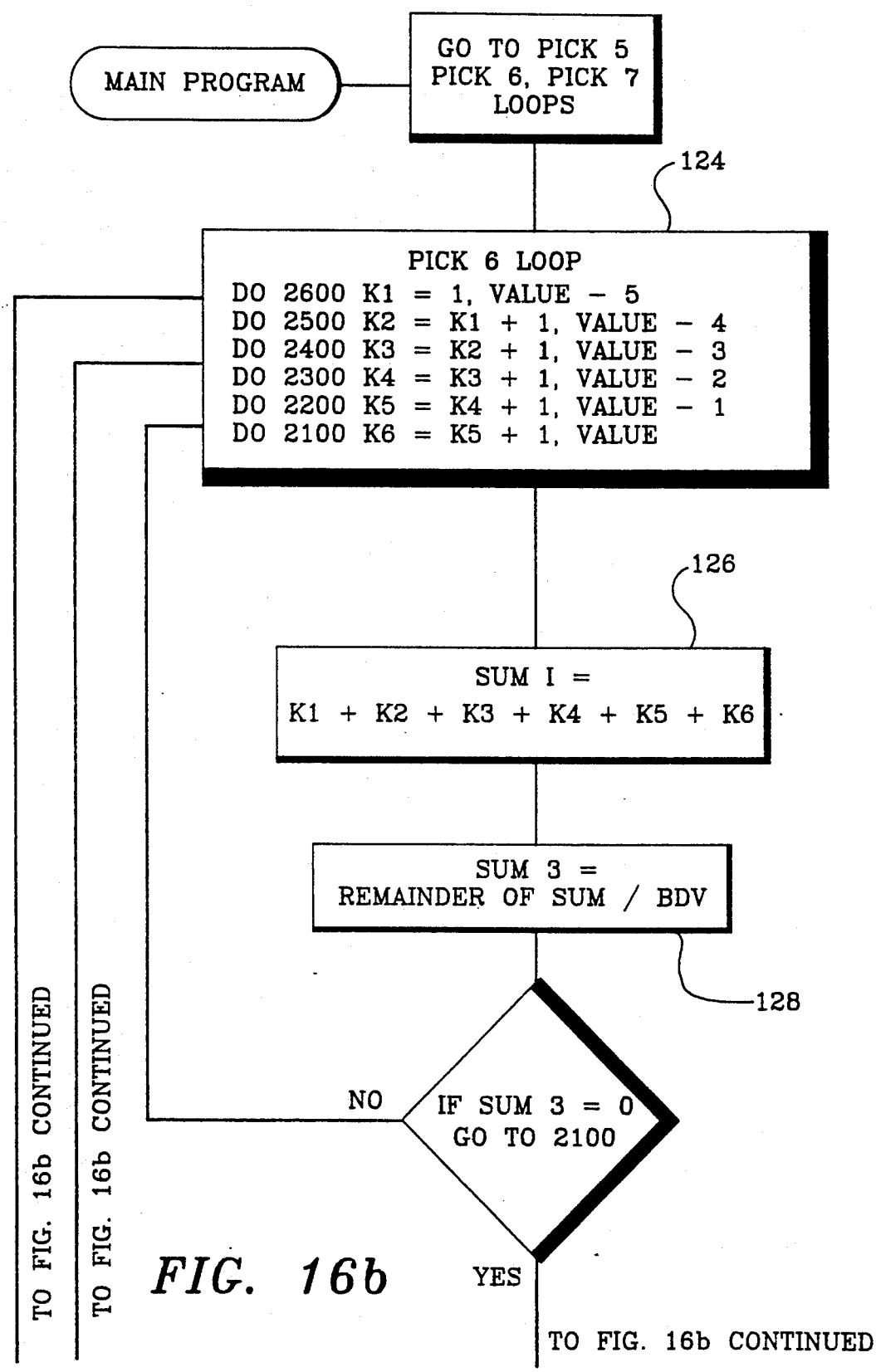
Figure 16B:
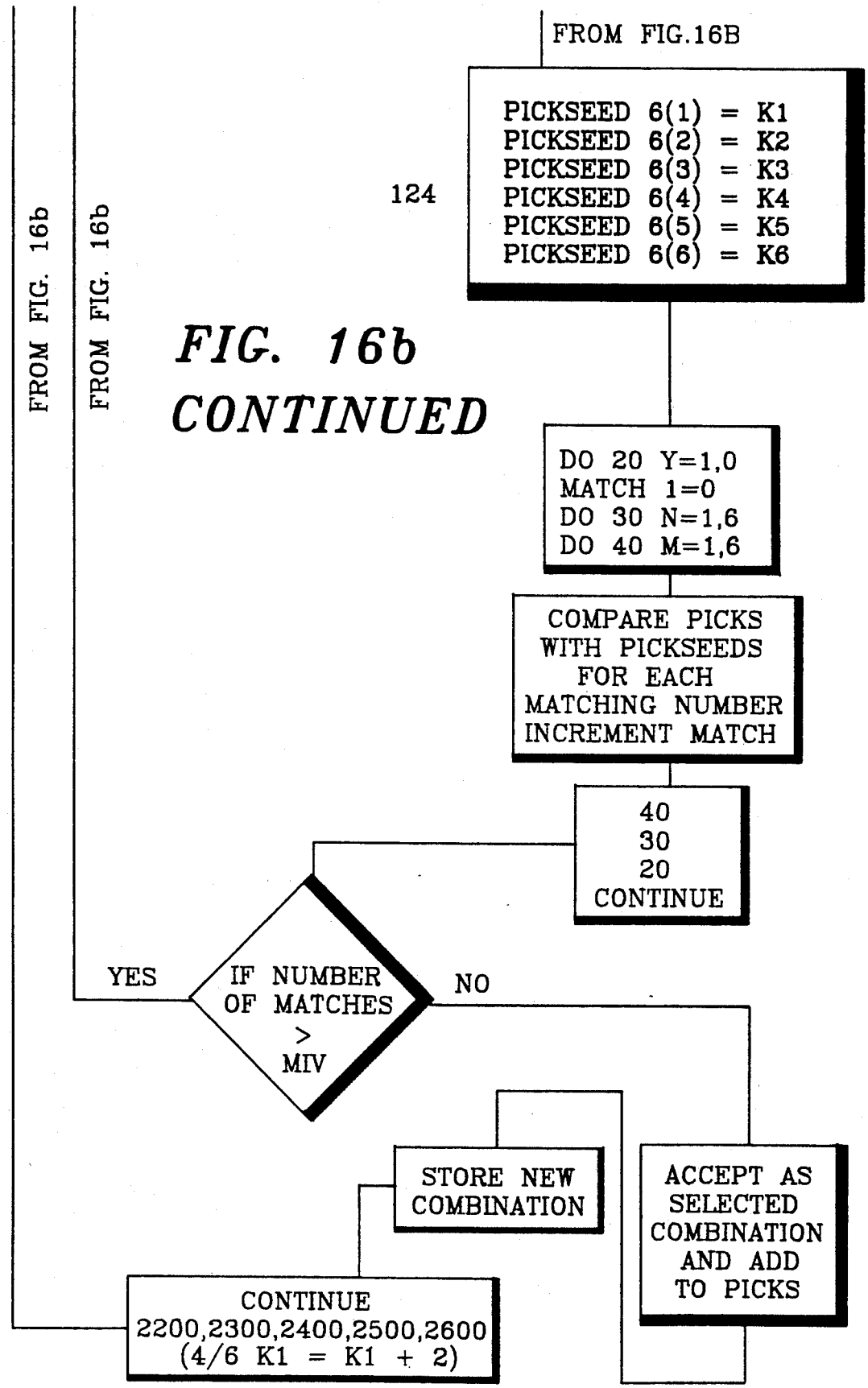

Taking the Pick 6 loop set forth in FIG. 16B as representative, the main algorithm will initially place the initial seed combination PICK 96 in RAM. As noted above, the PICK value may constitute the first number combination which matches the binomial distribution requirement, or may constitute a random number selected by the player. The algorithm then generates number combinations PICKSEED(S) 124. The initial PICKSEED is the combination 1, 2, 3, 4, .. X where X is jackpot level, e.g. "6" in a 6/X lottery such as the 6/49 Florida lottery.

The individual numbers within the PICKSEED combination are then summed SUM 126 (e.g. to 21) This number (21) is then divided into the BDV value 128. If the number divides evenly, i.e. if there is no remainder, the algorithm continues. If the value of SUM divided by BDV produces a remainder (as here 61/21 or 123/21), the algorithm loops back to the top of the subroutine to generate a new number. The numbers loop from the outermost number inward. Moreover the numbers loop to progressively smaller numbers. That is, in the case of a 40 number pool, the outermost number loops to RAYMAX=VALUE in FIGS. 16A-C) 40, the second outermost number loops to 39 RAYMAX(VALUE)-1, the third outermost number loops to 38 RAYMAX(-VALUE)-2 and so forth. The manner in which the combination numbers loop is shown in FIG. 17. For example, if, as here, the SUM 1, 2, 3, 4, 5, 6 fails to satisfy the BDV remainder requirement, the next incremental number combination will be 1, 2, 3, 4, 5, 7. In the case of a forty number set having a BDV of 123, the program will loop until it achieves a value which divides evenly into the BDV.

Assuming that the value of PICKSEED 124 divides evenly into BDV, the algorithm proceeds to the second loop within the main routine. During this loop, the individual component numbers comprising PICKSEED 124 (FIG. 18A) are compared to the initial seed combination PICK 96 (See FIG. 18B) previously stored in RAM. As shown more clearly in FIG. 18C, an integer value MATCH corresponding to the number of matching numbers between the PICK(S) and the combination PICKSEED is generated. The integer value MATCH is then compared to the minimum desired win value, MINVAL, e.g. "3" for 3/6 or "4" for a 4/7, etc. If the integer value of MATCH is less than MINVAL, the number combination is added to the selected combinations PICKS. If the value of MATCH is equal to or greater than MINVAL, the PICKSEED is rejected and the program loops back to the top of the algorithm so as to generate the next combination in the set as in FIG. 17. In the example shown in FIG. 18C, MATCH=MIV and the prospective combination is rejected.

If the PICKSEED satisfies the criteria of both loops within the main program, it is added to the PICKS, the algorithm loops back to increment a new PICKSEED combination 124, and the process repeats. The next combination which matches the BDV requirement, proceeds to the second loop as above. However, this PICKSEED will be sequentially compared BOTH to the original seed PICK as well as the second PICK. In order for the third combination to be selected, it must satisfy the matching criteria for BOTH the first and second PICKS. As shown in FIGS. 18B and 18C, each successive number which meets the BDV criteria is individually MATCHED number by number to the previously selected and increasing number of combinations contained in the PICKS file. Thus, each successively selected combination must meet the second MATCH requirement against all previously selected PICK(S).

In summation, the main algorithm has two loops which must be satisfied for a number combination to be selected. Initially, a prospective combination must match the BDV remainder requirement. Second, it must satisfy the MATCH requirement with respect to all previously selected combinations. It is to be noted that by varying the value of BDV, greater or smaller percentages of the combinations will filter through to the second part of the algorithm. For example, by setting BDV=1, each combination will filter through to the second part of the algorithm because the value of SUM divided by BDV will always divide evenly. By setting BDV=2, the combinations which SUM to an even number will filter to the second loop. Odd numbers which produce a positive remainder will be rejected.

An additional aspect of the present invention which may be utilized to further minimize the number of certain number combination sets is illustrated at the bottoms of FIGS. 16A-16C and 17. This feature is applicable to 4/6, 5/6, 4/5, 5/7, 6/7 number sets. For these number combinations, the inner most number increments by 3. This serves to further minimize the number of selected combinations while still generating at least one winning combination.

Figure 16C:
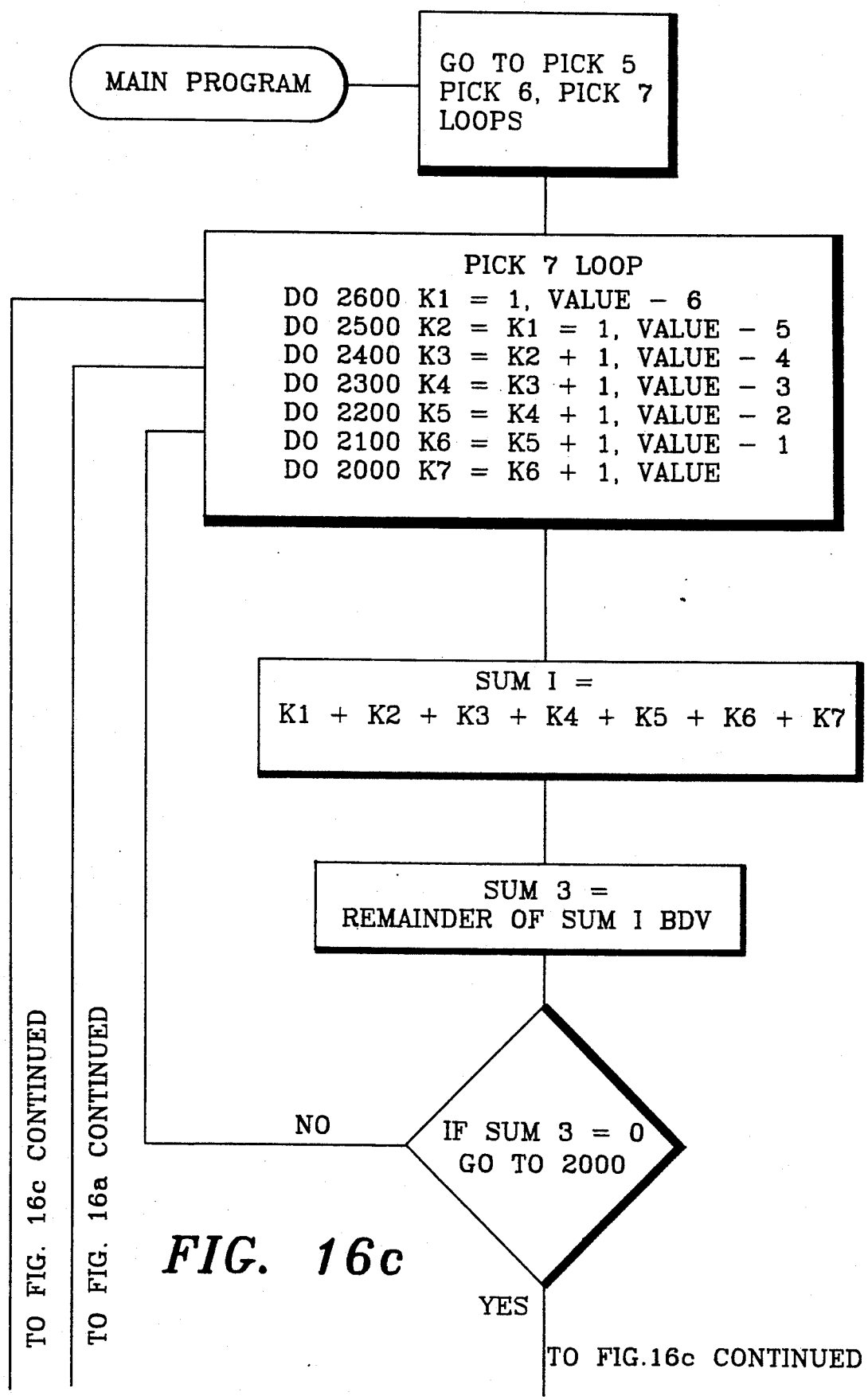

As is apparent from FIGS. 16A and 16C, the operation of the Pick 5 and Pick 7 main algorithms are substantially similar to that of the Pick 6 lotto algorithm. The only difference is the varying size of the PICK and PICKSEED arrays. As in the Pick 6 algorithm, in each of these algorithms, number combinations are generated utilizing a two part subroutine in which the particular PICKSEED must satisfy both a BDV remainder requirement and a MATCH/MIV comparison with respect to previously selected combinations. It is to be appreciated by those skilled in the art that the basic algorithmic model discussed above and set forth in FIGS. 11-14, and 16A-C can be utilized to generate number combinations for any lottery format such as Pick 4, Pick 8, Pick 12, etc.

Figure 15A:
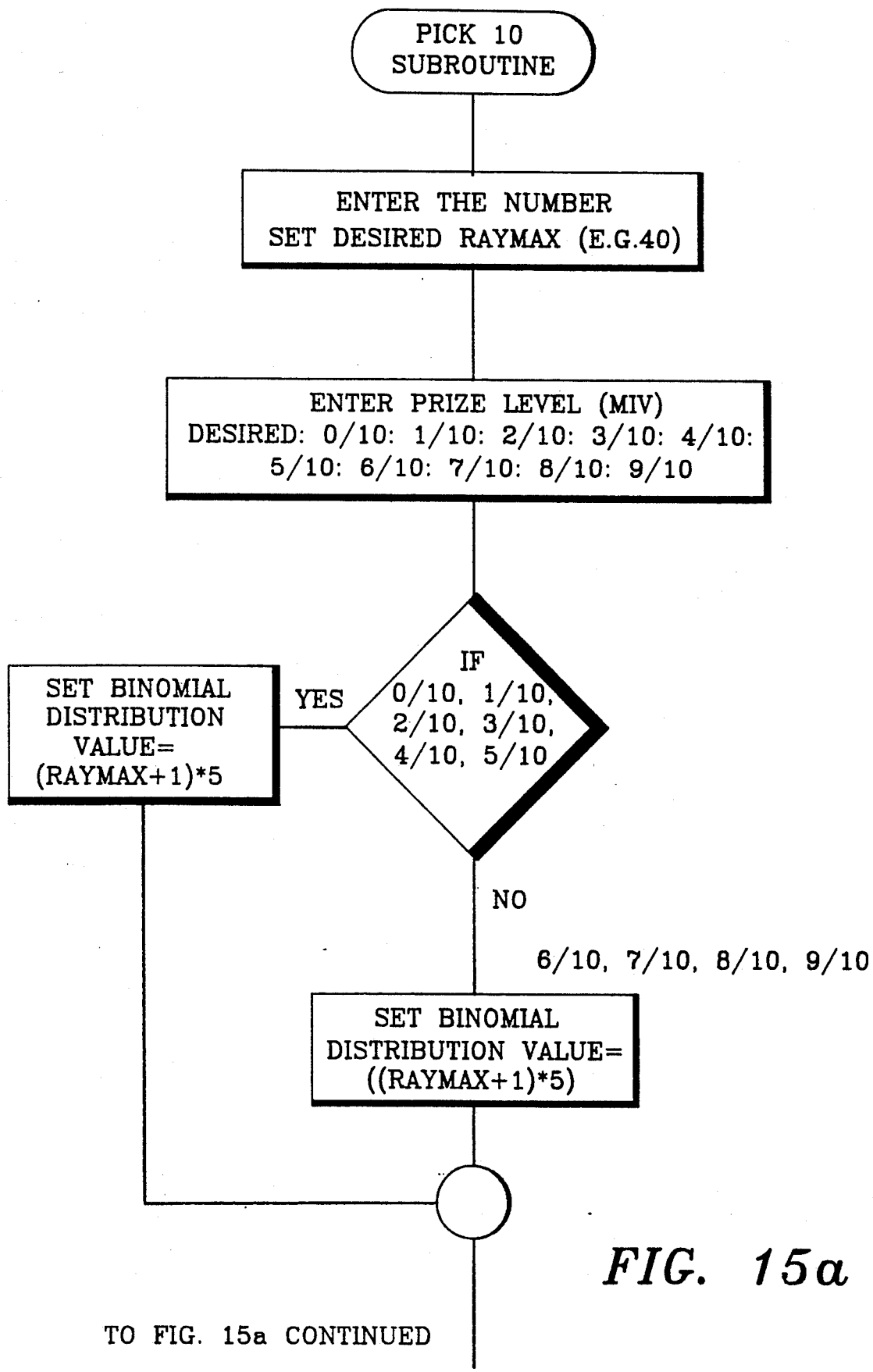
FIGS. 15 and 15 are an algorithmic representation of an alternative Pick 10, subroutine utilized in the present invention.
Figure 15A:
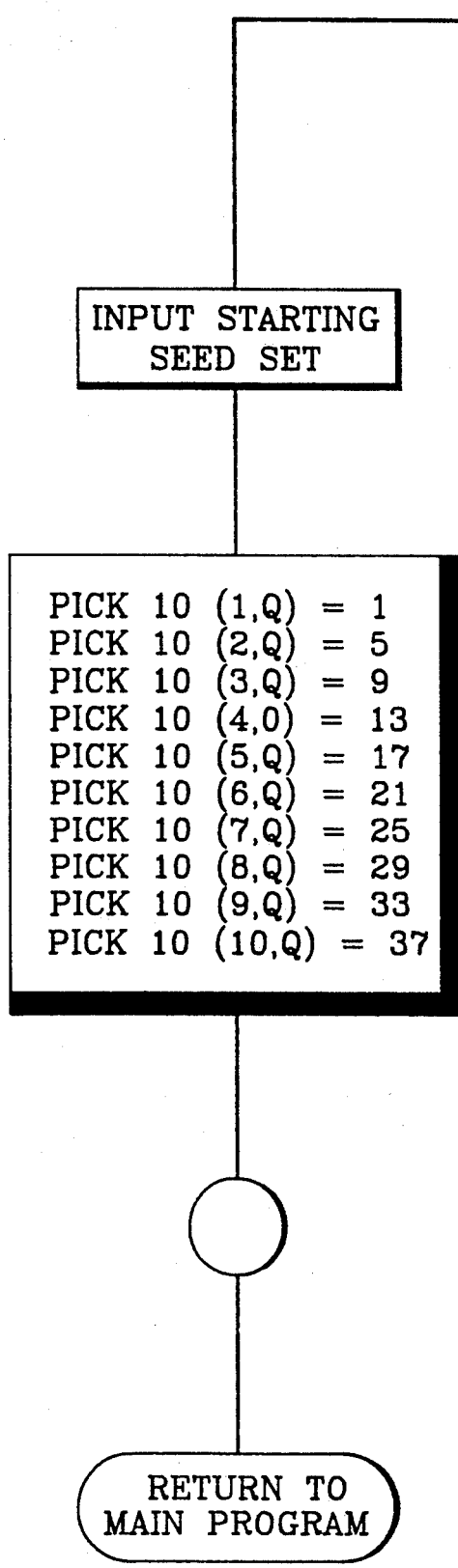
Figure 15B:
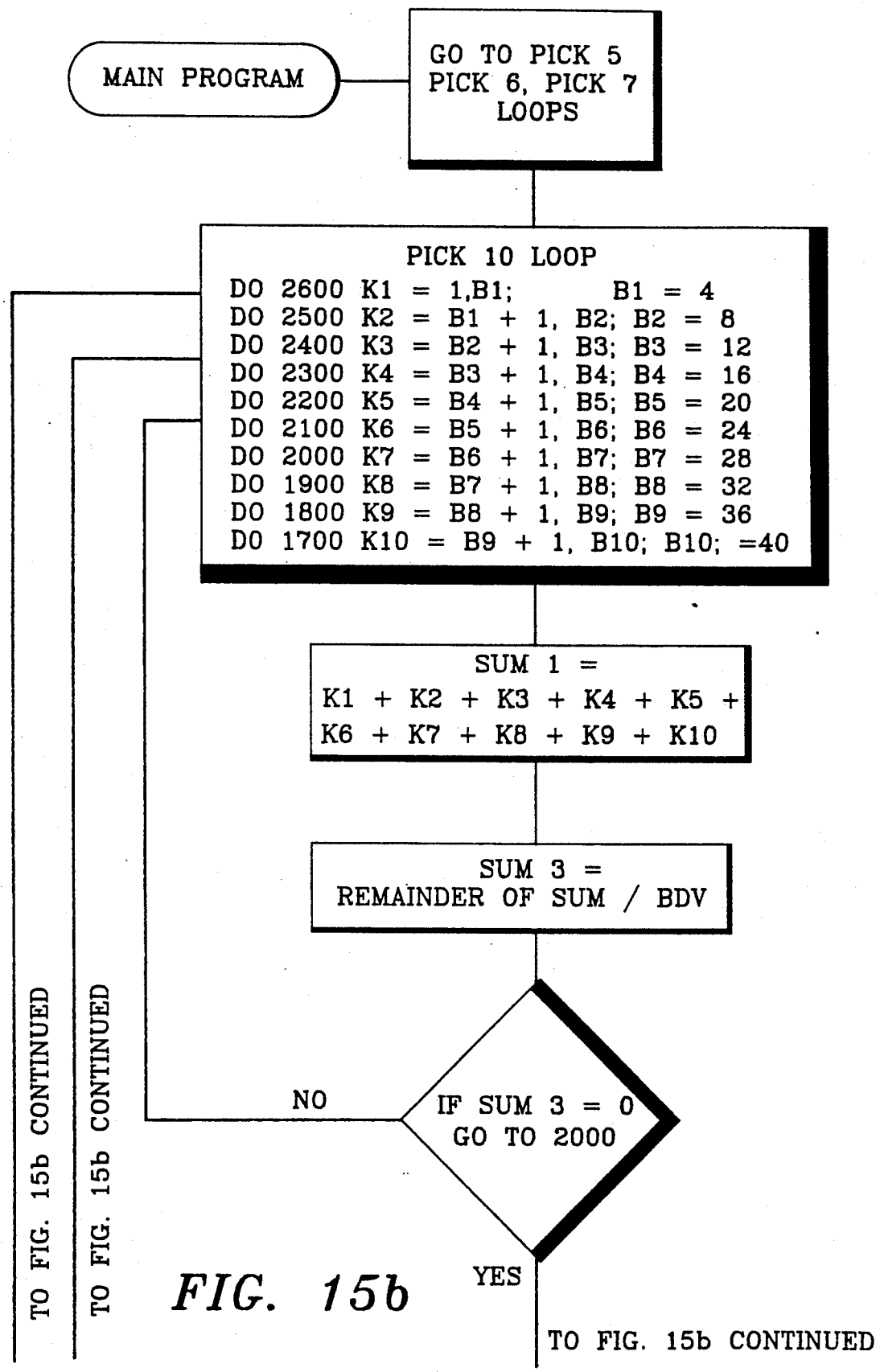

FIGS. 15A and 15B illustrate an alternative algorithm which is particularly applicable to keno type games. FIGS. 15A and 15B illustrate an example directed to a 40 number keno game in which 20 numbers are drawn. The numbers are partitioned into number sectors. That is, the outermost number does not loop from 1 to RAYMAX(40), but rather from 37-40; the second outermost number loops from 33-36 instead of 1-39, and so forth. The partitioning serves to reduce the amount of computing time required to generate the respective number set. As with the Pick 5, Pick 6, and Pick 7 the value of the initial PICKS may be the first number combination which satisfies the BDV requirement. As with the Pick 5, Pick 6 and Pick 7 algorithms, number combinations are selected utilizing two loop routines in which a prospective combination must meet both a BDV remainder criterion as well as a MATCH/MIV criterion with respect to previously selected combinations.

The operation of the present invention is now described with reference to all of the enclosed Figures. Initially, the player activates the lottery minimization system by activating the ON/OFF switch 11. After running an initial start-up check routine to identify system errors, the LCD may activate a GO command. Next, under the control of the set-up algorithm, the player will then select or type in a desired STATE 14 or COUNTRY 16 lotto or keno game which he or she desires to play. For the selected state or country, the LCD/LED 40 may prompt the player with a scrolling read-out of lotto games programmed into the system. The player will then select the desired game by activating the SELECT 17 key. Next, the player will then decide which prize level 20 (MIV) he or she desires, e.g. 3/6 or 4/6, and then press SELECT 17.

The player will then be prompted to enter a binomial distribution BDV to be utilized as an initial filter in the main algorithm. As discussed above, the binomial distribution values to be utilized to guarantee winning combinations have been empirically determined.

The LCD/LED or CRT monitor will then present a suggested starting seed PICK for the player. As discussed above, this combination will represent the first number in the combination set which satisfies the BDV criteria. If the player accepts the seed, the player then hits RUN, and the main algorithm proceeds to completion. If the player does not like the starting seed, he may enter his own starting seed utilizing the alphanumeric keys. The player's selection will appear on the LCD/LED 40 or CRT 34 monitor as entered. The player will hit RUN and the applicable main algorithm will proceed as discussed above to completion. While the algorithm is running, a running count of the PICKS will be provided on the LCD/LED 40 or CRT monitor 34 which will be incremented until completion.

Figure 7:
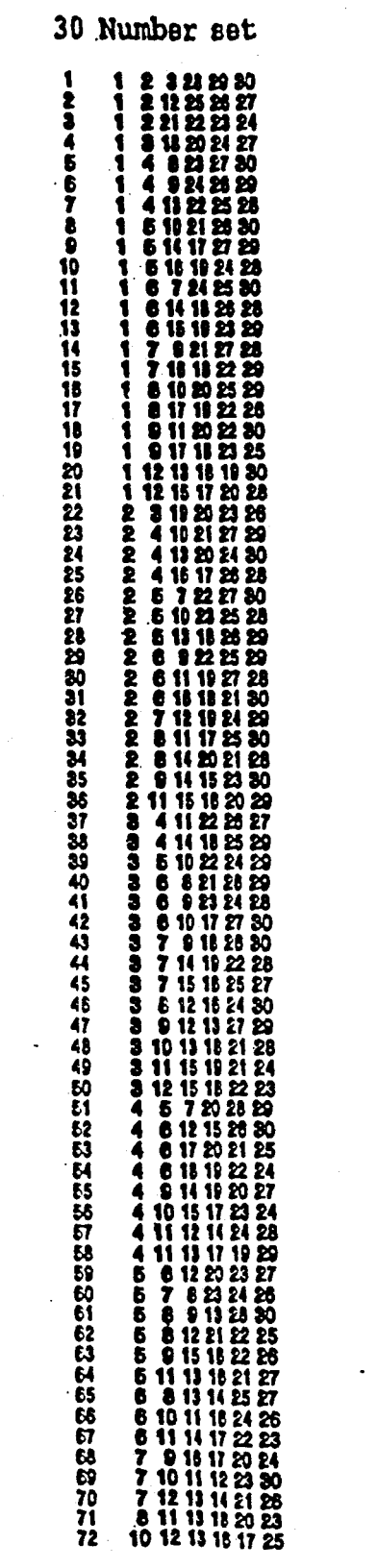

FIG. 7 illustrates an actual 30 number combination set for a 3/6 lottery (MIV=3) which was generated in accordance with the teachings of the present invention. The number set totals 72 combinations and utilizes every number (1-30) in the number pool. Currently, Sweden sponsors a lottery with a 6/30 configuration and is believed to pay out cash prizes at the 3/6 prize level. Thus, by generating this number set in accordance with the teachings of the present invention and by purchasing tickets containing all 72 combinations, the player is guaranteed to have at least one winning 3/6 ticket. While the player is guaranteed at least one winning combination in accordance with the present invention, on average, the player can be expected to possess multiple winning 3/6 combination tickets.

Figure 8:
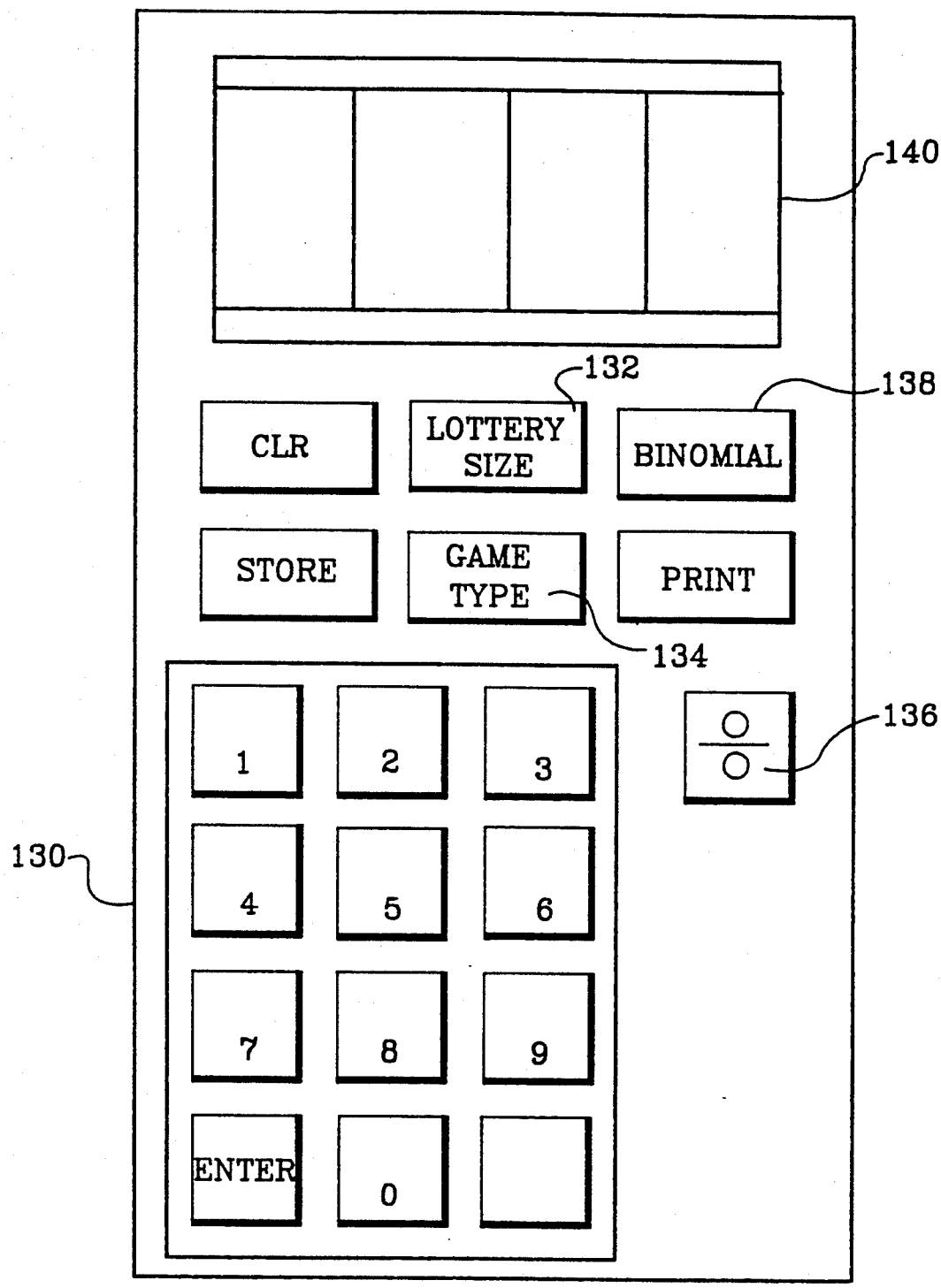
FIG. 8 is a plan view of an alternative number generator of the present invention.

FIG. 8 illustrates a simplified version of the number generator of the present invention. In this embodiment, the present invention comprises a simplified pushbutton entry device 130 in which the player directly enters the program variables such as LOTTERY SIZE 132 size (RAYMAX), the jackpot level (Z) GAME TYPE 134, the desired winning combination level MIV entered by utilizing the division key 136 (e.g. by entering 3/6), and the BDV value 138. This device incorporates the microprocessor, PROM and RAM of FIG. 2, an LCD/LED readout 140 and output device such as a printer, magnetic memory, CD-RAM or disk drive. The device may alternatively be connected to a CRT monitor. As with the embodiment of FIG. 1, PROM stores the algorithms of FIGS. 10-18.

Figure 9:
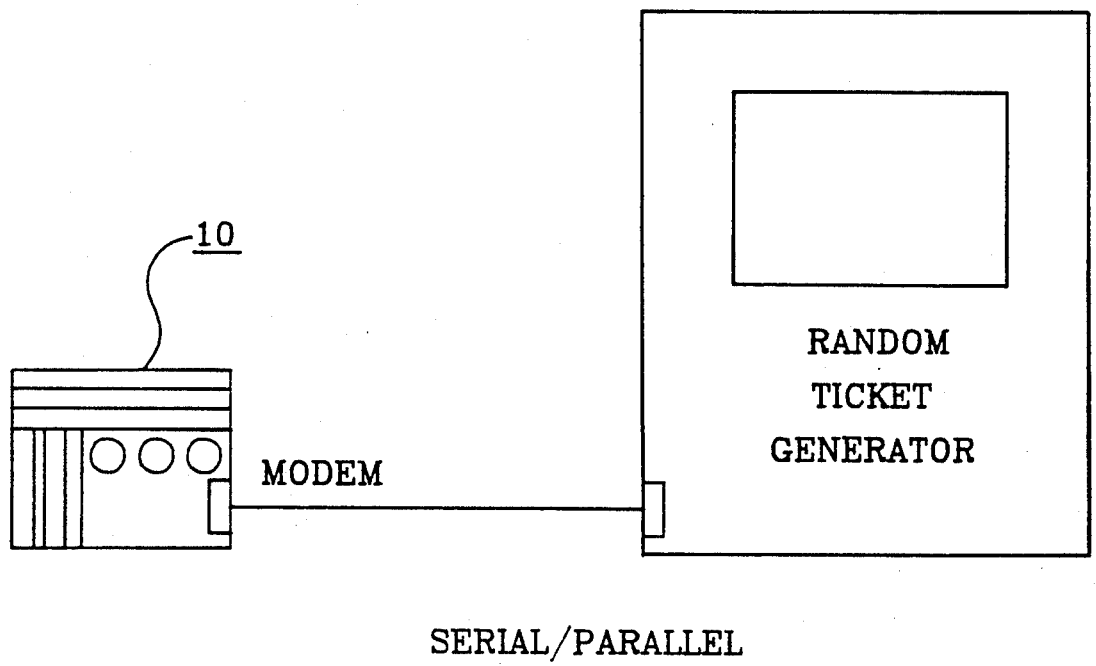
FIG. 9 is a block diagram of a transmission apparatus for transmitting generated lotto or keno number sets to a remote lotto or keno number generator.

In both embodiments, after the number combinations are generated, the player will see the final count on LED/LCD or CRT indicating the total number of combinations generated. The player can then store the selected combinations on RAM, hard disk, CD, or other storage medium. The player can transmit the number set via modem to a remote lottery ticket generator as shown in FIG. 9. The player can also print out the selected combinations which may be faxed via fax interface 39 to a remote location. Additionally, the player may save on a floppy disk which can be stored or transported to a remote lottery ticket generator.

After the lottery tickets are purchased and the drawing is made, the player may then utilize a MATCH program to determine which of the tickets contain winning combinations. The MATCH program is set forth in FIG. 6. In operation, the player initially inputs the type of lotto game played and the minimum winning combination 140. The winning combination is then input 142. Utilizing a conventional loop algorithm 144, the winning draw is then compared number by number to each of the N combinations selected and representing the lottery tickets ultimately purchased by the player. The MATCH program flags 146 those PICKS which match a minimum winning quantity of the numbers contained in the winning draw.

The present invention has been described with reference to the above embodiments. It is to be appreciated by those skilled in the art that other embodiments fall within the spirit and scope of the present invention and that the invention's true scope is to be determined with reference to the claims appended hereto.

---

Appendix A

---

1. Declaration Section:
    A. All variables are integer type:
        1. Declare all Print variables
        2. Declare all Counter variables: Q=1
        3. Declare all Special arrays:
            Pick5 (5,100000)
            Pick6 (6,100000)
            Pick7 (7,100000)
            Pickseed5 (5)
            Pickseed6 (6)
            Pickseed7 (7)
2. User Input Section:
    A. User defined inputs:
        1. Input the "output file" type as:
            a. Pick 5 output file (proceed to subroutine Pick 5)
            b. Pick 6 output file (proceed to subroutine Pick 6)
            c. Pick 7 output file (proceed to subroutine Pick 7)
        2. For Subroutine Pick 5: Open(unit=15,file=filename)
            a. Input the maximum integer VALUE for the "complete"
                System to be wheeled RAYMAX (e.g. 40)
            b. Input the minimum integer value for the "prize
                MIV level" (e.g. "3" for 3 out of 5)
            c. Input the printing integer value for screen
                PSV display purposes (e.g. 100000)
            d. Input the integer binomial distribution value
                BDV (default value = 1)
            e. Input the starting values for the Pick5 (5,Q)
                array (e.g. 1,2,3,4,5) as
                    PICK5(1,Q)=1
                    PICK5(2,Q)=2
                    PICK5(3,Q)=3
                    PICK5(4,Q)=4
                    PICK5(5,Q)=5
            f. Return to main program.
        3. For Subroutine Pick 6: Open(unit=16,file=filename)
            a. Input the maximum integer VALUE for the "complete"

Appendix A -continued

System to be wheeled RAYMAX (e.g. 49)
   b. Input the minimum integer value for the "prize
      MIV level" (e.g. "4" for 4 out of 6)
   c. Input the printing integer value for screen
      PSV display purposes (e.g. 1000000)
   d. Input the integer binomial distrib.tiuon value
      BDV (default value = 1)
   e. Input the starting values for the Pick6 (6,Q)
      array (e.g. 1,2,3,4,5,6) as
         PICK6(1,Q)=1
         PICK6(2,Q)=2
         PICK6(3,Q)=3
         PICK6(4,Q)=4
         PICK6(5,Q)=5
         PICK6(6,Q)=6
   f. Return to main program.
4. For Subroutine Pick 7: Open(unit=17,file=filename)
   a. Input the maximum integer VALUE for the "complete"
      System to be wheeled RAYMAX (e.g. 34)
   b. Input the minimum integer value for the "prize
      MIV level" (e.g. "4" for 4 out of 7)
   c. Input the printing integer value for screen
      PSV display purposes (e.g. 1000000)
   d. Input the integer binomial distribution value
      BDV (default value = 1)
   e. Input the starting values for the Pick7 (7,Q)
      array (e.g. 1,2,3,4,5,6,7) as
         PICK7(1Q)=1
         PICK7(2,Q)=2
         PICK7(3,Q)=3
         PICK7(4,Q)=4
         PICK7(5,Q)=5
         PICK7(6,Q)=6
         PICK7(7,Q)=7
   f. Return to main program.
3. Main Program Lottery Number Generator
   A. If Subroutine Pick 5 goto Pick 5 loops:
   B. If Subroutine Pick 6 goto Pick 6 loops:
   C. If Subroutine Pick 7 goto Pick 7 loops:
   D. Pick 5 Loops:

```
      1. DO 2600, K1 =      1, VALUE-4; VALUE = RAYMAX
         DO 2500, K2 = K1+1, VALUE-3
         DO 2400, K3 = K2+1, VALUE-2
         DO 2300, K4 = K3+1, VALUE-1
         DO 2200, K5 = K4+1, VALUE
         Z=Z+1   !! SCREEN OUTPUT FILE COUNTER
         SUM1= K1+K2+K3+K4+K5            !! SUMS OF THE DIGITS
                                            COUNT
         SUM3=MOD(SUM1,BDV)              !! BINOMIAL DISTRIBUTION
                                            VALUE
         IF(SUM3.NE.0) GOTO 2200
         FLAG=MOD(Z,PSV)   !! PRINT SCREEN VALUE
         IF(FLAG.EQ.0)
             WRITE THE VALUE TO THE SCREEN
         ENDIF
         PICKSEED5(1)=K1
         PICKSEED5(2)=K2
         PICKSEED5(3)=K3
         PICKSEED5(4)=K4
         PICKSEED5(5)=K5
         DO 20, Y=1,Q
            MATCH1=0
               DO 30, N=1,5
                DO 40, M=1,5
                IF((PICKSEED5(N).EQ.(PICK5(M,Y))) THEN
                   MATCH1=MATCH1+1
                ENDIF
                IF(MATCH1.GT.MIV) GOTO 2200
             40 CONTINUE
            30 CONTINUE
         20    CONTINUE
                                         !!! THE ABOVE 11 LINES OF CODE
                                             REPRESENTS THE MINIMIZATION
                                             ALGORITHM
         WRITE(15) Q,(PICK5(J,Q),J=1,5)
         Q=Q+1
         DO 50 K=1,5
      50 PICK5(K,Q)=PICKSEED5(K)
      2200 CONTINUE
      2300 CONTINUE
```

Appendix A

```
                    2400 CONTINUE
                    2500 CONTINUE
                       (4/5 k1 = k1 + 2)
                    2600 CONTINUE
                       WRITE(15) Q,(PICK5(J,Q),J=1,5)
                       GOTO 3000  !!! GO TO END OF PROGRAM
E. Pick 6 Loops:
        1. DO 2600, K1 =    1, VALUE-5; VALUE = RAYMAX
           DO 2500, K2 = K1+1, VALUE-4
           DO 2400, K3 = K2+1, VALUE-3
           DO 2300, K4 = K3+1, VALUE-2
           DO 2200, K5 = K4+1, VALUE-1
           DO 2100, K6 = K5+1, VALUE
           Z=Z+1  !! SCREEN OUTPUT FILE COUNTER
           SUM1= K1+K2+K3+K4+K5+K6          !! SUMS OF THE DIGITS
                                               COUNT
           SUM3=MOD(SUM1,BDV)               !! BINOMIAL DISTRIBUTION
                                               VALUE
           IF(SUM3.NE.0) GOTO 2100
           FLAG=MOD(Z,PSV)  !! PRINT SCREEN VALUE
           IF(FLAG.EQ.0)
               WRITE THE VALUE TO THE SCREEN
           ENDIF
           PICKSEED6(1)=K1
           PICKSEED6(2)=K2
           PICKSEED6(3)=K3
           PICKSEED6(4)=K4
           PICKSEED6(5)=K5
           PICKSEED6(6)=K6
           DO 20, Y=1,Q
              MATCH1=0
                DO 30, N=1,6
                  DO 40, M=1,6
                  IF((PICKSEED6(N).EQ.(PICK6(M,Y))) THEN
                     MATCH1=MATCH1+1
                  ENDIF
                  IF(MATCH1 GT.MIV) GOTO 2100
               40 CONTINUE
              30 CONTINUE
           20    CONTINUE
                                            !!! THE ABOVE 11 LINES OF CODE
                                                REPRESENTS THE MINIMIZATION
                                                ALGORITHM
              WRITE(15) Q,(PICK6(J,Q),J=1,6)
              Q=Q+1
              DO 50 K=1,6
           50 PICK6(K,Q)=PICKSEED6(K)
           2100 CONTINUE
           2200 CONTINUE
           2300 CONTINUE
           2400 CONTINUE
           2500 CONTINUE
               ( *** for 4 out 6  k1=k1 + 2)
           2600 CONTINUE
               WRITE(15) Q,(PICK6(J,Q),J=1,6)
               GOTO 3000 !!! GO TO END OF PROGRAM
F. Pick 7 Loops:
        1. DO 2600, K1 =    1, VALUE-6; VALUE = RAYMAX
           DO 2500, K2 = K1+1, VALUE-5
           DO 2400, K3 = K2+1, VALUE-4
           DO 2300, K4 = K3+1, VALUE-3
           DO 2200, K5 = K4+1, VALUE-2
           DO 2100, K6 = K5+1, VALUE-1
           DO 2000, K7 = K6+1, VALUE
           Z=Z+1  !! SCREEN OUTPUT FILE COUNTER
           SUM1= K1+K2+K3+K4+K5+K6+K7       !! SUMS OF THE DIGITS
                                               COUNT
           SUM3=MOD(SUM1,BDV)               !! BINOMIAL DISTRIBUTION
                                               VALUE
           IF(SUM3.NE.0) GOTO 2000
           FLAG=MOD(Z,PSV)  !! PRINT SCREEN VALUE
           IF(FLAG.EQ.0)
               WRITE THE VALUE TO THE SCREEN
           ENDIF
           PICKSEED7(1)=K1
           PICKSEED7(2)=K2
           PICKSEED7(3)=K3
           PICKSEED7(4)=K4
           PICKSEED7(5)=K5
           PICKSEED7(6)=K6
```

Appendix A -continued

```
        PICKSEED7(7)=K7
        DO 20, Y=1,Q
            MATCH1=0
            DO 30, N=1,7
            DO 40, M=1,7
                IF((PICKSEED7(N).EQ.(PICK7(M,Y))) THEN
                    MATCH1=MATCH1+1
                ENDIF
                IF(MATCH1.GT.MIV) GOTO 2000
            40 CONTINUE
            30 CONTINUE
        20   CONTINUE
                        !!! THE ABOVE 11 LINES OF CODE
                            REPRESENTS THE MINIMIZATION
                            ALGORITHM
            WRITE(15) Q,(PICK7(J,Q),J=1,7)
            Q=Q+1
            DO 50 K=1,7
        50 PICK7(K,Q)=PICKSEED7(K)
        2000 CONTINUE
        2100 CONTINUE
        2200 CONTINUE
        2300 CONTINUE
        2400 CONTINUE
        2500 CONTINUE
            (**** for 5 out of 7   k1 = k1 + 2)
        2600 CONTINUE
            WRITE(15) Q,(PICK7(J,Q),J=1,7)
            GOTO 3000   !!! GO TO END OF PROGRAM
4. End Of Program
        3000 CLOSE(15)
            CLOSE(16)
            CLOSE(17)
            STOP
```

What is claimed is:

1. A device for generating lottery combinations comprising:
   a keyboard entry system comprising a keyboard entry panel having first keypad entry means for inputting a number comporting to the total size of a lottery number pool to be played; second keypad entry means for inputting a desired minimum win level; and third keypad entry means for inputting an initial number combination;
   a processor in association with an algorithm stored in electronic memory means for generating a plurality of number combinations utilizing each number of said inputted total lottery number pool, one of said generated number combinations corresponding to a winning combination at said inputted minimum win level, said processor operating at a speed of over one million instructions per second; and
   means for outputting said plurality of generated number combinations.

2. The device for generating lottery combinations of claim 1 wherein said prestored algorithm generates said number combinations based upon a binomial distribution value.

3. The device for generating lottery combinations of claim 1 further comprising means for transmitting said generated number combinations to a remote location.

4. The device of claim 4 wherein said means for transmitting said generated number sets is a modem.

5. A device for generating lottery combinations comprising:
   a keyboard entry system comprising a keyboard entry panel having first keypad entry means for inputting a number comporting to the total size of a lottery pool to be played, and second keypad entry means to input a minimum desired winning prize level, and an initial combination;
   a processor, in accordance with an algorithm stored in a memory device, for generating a plurality of number combinations utilizing each number in said total lottery pool, said number combinations guaranteeing at least one winning combination at said minimum desired prize level, said processor operating at a speed of over one million instructions per second;
   electronic storage means for storing said generated number combinations;
   modem means for transmitting said generated number combinations to a remote location.

6. The device for generating lottery combinations of claim 5 wherein said pre-stored algorithm compares a prospective number combination with previously selected combinations and accepts said prospective combination if matching criteria between each said previously selected combinations and said prospective combination are met.

7. The device of claim 6 wherein said criterion is the integer value of the minimum desired prize level.

8. The device of claim 6 further comprising facsimile means for transmitting said generated number combinations to a remote ticket generator.

9. The device of claim 5 wherein said binomial distribution value is determined by the equation:

$$BDV = (RAYMAX+1) \times Z;$$

where RAYMAX equals the size of the lottery number pool, and Z equals the jackpot level of the lottery pool to be played divided by 2.

10. The device of claim 5 wherein said binomial distribution value is determined by the equation:

$$BDV = ((RAYMAX + 1) \times Z)/2;$$

where RAYMAX equals the size of the lottery number pool, and Z equals the jackpot level of the lottery pool to be played divided by 2.

11. A method for generating lottery combinations comprising the following steps:

inputting utilizing keypad entry means a number comporting to the total size of a lottery pool to be played;

inputting utilizing keypad entry means an initial number combination to be played;

inputting utilizing keypad entry a minimum winning combination level; and generating utilizing a processor operating at a speed of at least one million instructions per second a plurality of number combinations in accordance with a pre-stored algorithm, said algorithm factoring in said initial number combination, said total lottery pool size and said minimum winning combination level, said plurality of number combinations containing at least one winning combination achieving said minimum winning combination level; and outputting said selected number combinations for storage in an electronic storage device.

12. The method of claim 11 further comprising the added step of determining which of said generated number combinations contains a winning combination.

13. A method for generating lottery combinations comprising:

inputting a number comporting to the total size of a lottery pool to be played:

inputting the numbers of a combination set to be played;

inputting a predetermined prize level;

generating with processor means, operating at a speed of over one million instructions per second, a plurality of number combinations in accordance with an algorithm pre-stored in electronic memory means, said pre-stored algorithm determining whether each said number combination matches a binomial distribution criterion and further determining whether each said number combination meets a comparison criteria with said combination set whereby the generation of a winning combination at said predetermined prize level is guaranteed; and storing said selected number combinations in an electronic memory device.

* * * * *